United States Patent [19] | [11] 4,204,207
Bakula et al. | [45] May 20, 1980

[54] VIDEO DISPLAY OF IMAGES WITH VIDEO ENHANCEMENTS THERETO

[75] Inventors: Richard E. Bakula, Indialantic; Edward C. McCarthy, Indian Harbor Beach, both of Fla.

[73] Assignee: Harris Corporation, Cleveland, Ohio

[21] Appl. No.: 829,043

[22] Filed: Aug. 30, 1977

[51] Int. Cl.[2] .............................................. G06K 15/20

[52] U.S. Cl. ..................................... 340/723; 340/751; 340/799

[58] Field of Search ................ 340/324 AD, 723, 731, 340/799, 751

[56] References Cited

U.S. PATENT DOCUMENTS

| | | | |
|---|---|---|---|
| 3,351,929 | 11/1967 | Wagner | 340/799 X |
| 3,659,283 | 4/1972 | Ophir | 340/731 |
| 3,665,450 | 5/1972 | Leban | 340/731 |
| 3,854,130 | 12/1974 | Ligocki | 340/799 X |
| 3,868,673 | 2/1975 | Mau et al. | 340/324 AD |
| 3,895,374 | 7/1975 | Williams | 340/324 AD |
| 3,952,296 | 4/1976 | Bates | 340/324 AD |
| 3,988,728 | 10/1976 | Inone et al. | 340/324 AD |
| 4,079,458 | 3/1978 | Rider et al. | 340/324 AD |
| 4,118,695 | 10/1978 | Ogawa et al. | 340/723 X |

*Primary Examiner*—David L. Trafton

[57] ABSTRACT

A video display terminal is disclosed for use in displaying images of data characters on a display screen with modifications to the video characteristics thereof. Coded data characters are provided which represent images to be displayed. Associated with each data character is a coded enhancement character representing a video modification or enhancement to be made to the video image of the associated data character. Video signals are provided for forming the image represented by a data character. These video signals are modified by the enhancement represented by the associated enhancement character and the modified video signal is employed for forming the video image of the data character along with the video enhancement thereto.

8 Claims, 32 Drawing Figures

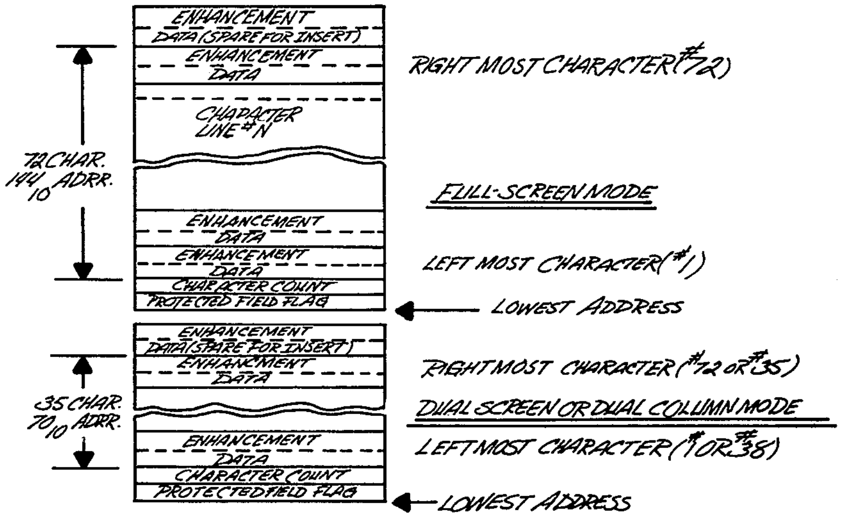
CHARACTERLINE STORAGE FORMAT
FIG. 11
FIG 12
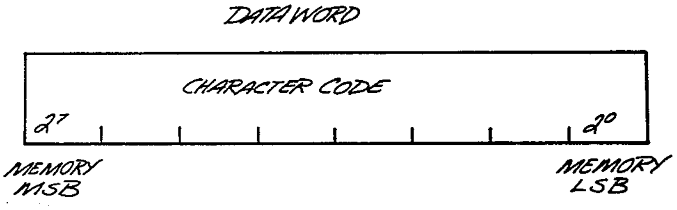
FIG. 13
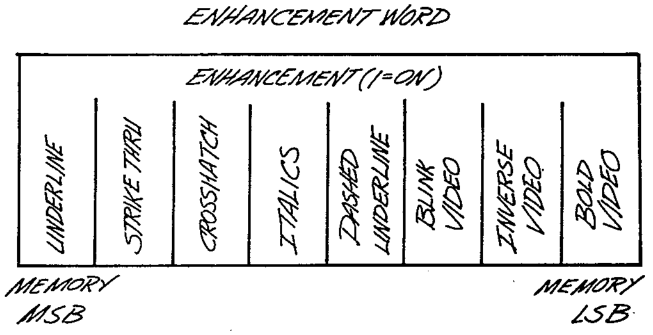

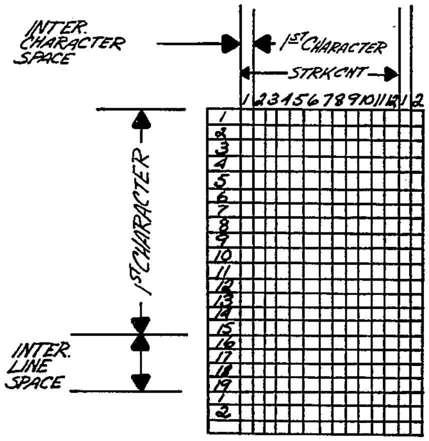
FIG. 20
FIG. 21a
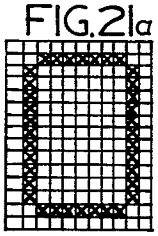
FIG. 21b
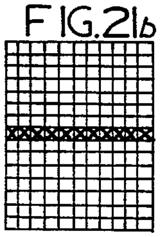
FIG. 21c
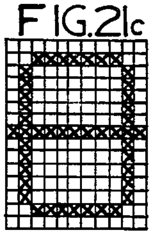
FIG. 22a
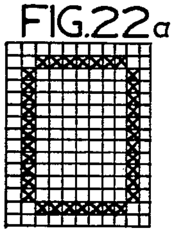
FIG. 22b
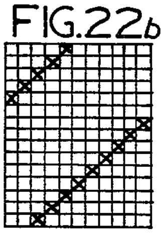
FIG. 22c
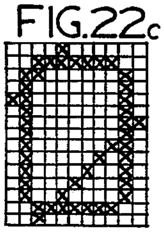
FIG. 23a
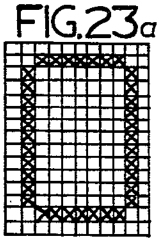
FIG. 23b
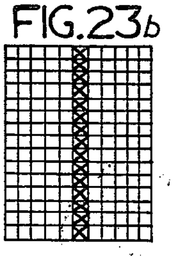
FIG. 23c
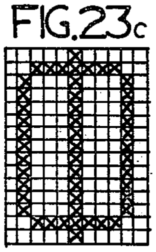

VIDEO DISPLAY OF IMAGES WITH VIDEO ENHANCEMENTS THERETO

BACKGROUND AND FIELD OF THE INVENTION

This invention relates to the art of video display of images and, more particularly, to improvements in modifying or enhancing the visual presentation of images representing data characters and the like.

Whereas the invention is described herein in conjunction with a video display system incorporating a host computer and individual terminals, it is to be appreciated that the invention is not limited thereto but may also be employed in a stand-alone video display terminal or other apparatus for displaying graphical images wherein it is desirable to provide video modifications or enhancements thereto.

Video display systems which employ terminals having means for displaying data characters as well as for modifying the video characteristics of the displayed characters are known in the art. Examples of such display systems include the U.S. Pat. Nos. to R. C. Williams 3,895,374, 3,895,375 and 3,896,428. The display terminal described in those patents has the ability to display a data character as a dot pattern within a dot matrix. A horizontal T.V. scan is employed so that as the beam sweeps across the face of the display screen it forms horizontal dot slices of each character in a line of characters. This is repeated for several scans until a line of data characters is presented. In addition, the terminals described in these patents also provide video enhancements, which are referred to in the patents as display attributes. These refer to the changing of the normal display of a data character from being merely a dot pattern to a variation in its video appearance, such as: inverted in appearance, intensified or underlined. In those terminals, the data characters are encoded in binary form and preceded in the data stream by a binary encoded attribute character which includes attribute bits specifying the display attributes which the data characters are to have when displayed.

A notable disadvantage of providing attributes as discussed above is that the terminal must employ logic circuitry to determine, in conjunction with the forming of the image of a data character, whether or not the attribute for that data character is to be changed. This is because each attribute character is followed by one or more data characters until the particular attribute is to be changed and then a new attribute character appears in the data stream. Consequently, logic circuitry is required to continuously monitor the data stream to determine if the attribute has been changed. Since the attribute character is not to be displayed itself there results a non-continuous data stream of data characters intermixed with attribute characters at irregular occurring intervals. Consequently, irregularly occurring time spaces result when no data characters are being displayed (because an attribute character is being decoded) and special logic circuitry must be employed if the data characters are to be generated for display at regularly occurring times.

SUMMARY OF THE INVENTION

It is an object of the present invention to provide a video display system wherein images of data characters and the like may be enhanced or modified without requiring complex logic circuitry for checking whether the display attributes or enhancements have been changed.

It is another object of the present invention to display images of data characters wherein each data character has associated therewith an enhancement character which causes video modification of the display of the data character with one or a plurality of different enhancements.

It is a still further object of the present invention to provide non-displaying enhancement characters or delimiters in a data stream at regularly occurring intervals therein so that special logic circuitry is not required in order to display images of the characters at regularly occurring intervals.

In accordance with the present invention, video images of data characters are displayed with modifications to the video characteristics thereof. Coded data characters are provided which represent images to be displayed. Associated with each data character is a coded enhancement character representing a video enhancement to be made to the video image of the data character. Video signals are generated for forming the video image of the data character and these are modified in accordance with the enhancement represented by the associated enhancement character. The modified video signal is employed for forming the video image with the video enhancement thereto.

BRIEF DESCRIPTION OF THE DRAWINGS

The foregoing and other objects and advantages of the invention will become more readily apparent from the following description of the preferred embodiment of the invention as taken in conjunction with the appended drawings wherein:

FIG. 11 is a schematic illustration showing the manner in which enhancement data and character data are arranged for a character line;

FIG. 12 is a schematic illustration showing the format of a data character;

FIG. 13 is a schematic illustration showing the format of an enhancement character;

FIG. 20 is a schematic illustration of a pixel matrix;

FIGS. 21*a, b,* and *c* are graphical illustrations showing images formed on the video display;

FIGS. 22*a, b,* and *c* are similar to that of FIGS. 21*a, b,* and *c* but showing a different combination of graphical images formed on the video display;

FIGS. 23*a, b,* and *c* are similar to those of FIGS. 21*a, b, c,* and 22*a, b,* and *c* but showing a different combination of graphical images formed on the video display;

DETAILED DESCRIPTION

General Description

Reference is now made to the drawings wherein the showings are for purposes of illustrating a preferred embodiment of the invention only and not for purposes of limiting same.

Figure 1:
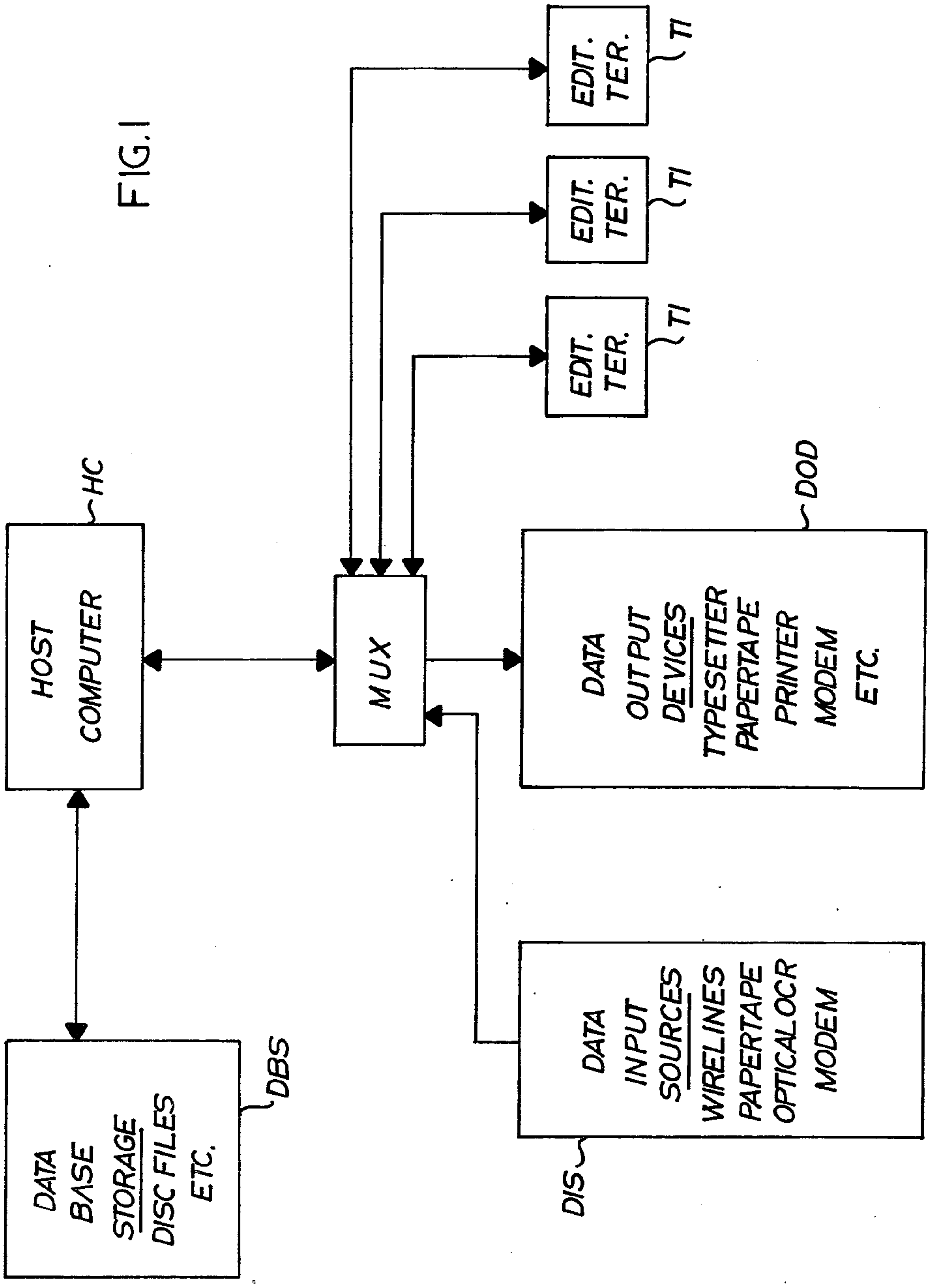
FIG. 1 is an overall system block diagram illustrating an application of the present invention.

FIG. 1 is a generalized block diagram illustrating a system to which the present invention applies. Here there is illustrated a host computer HC which, for example, may take the form of a PDP-11/35 computer with 64K words of memory obtained from Digital Equipment Corporation. Associated with the host computer is a large data base storage DBS and which may take the form of disc files, such as two 2.4 million byte moving head discs. The system disclosed in FIG. 1 also includes data input sources DIS which may include, for example, wire lines from which UPI and AP stories are obtained. Other input sources may include a paper tape source or an optical (OCR) reader or a modem.

These data input sources provide stories and the like which may be inputted under the control of the host computer HC by way a system multiplexer MX for storage in the appropriate file at the data base storage DBS. Also associated with the system is a plurality of editing terminals T1, T2, through TN. Each editing terminal takes the form of a processor driven video display terminal having a keyboard and a display screen. With such a system, a news writer may use an editing terminal to create a story which is displayed on the display screen. Once the writer is satisfied with the story, he will actuate a send key and coded data representative of the story will be supplied through the system multiplexer MX to the host computer HC which will then store the story in a particular storage location at the data base storage DBS for subsequent retrieval. Other stories may be obtained from the data input sources DIS and routed by host computer HC for storage in the data base storage DBS.

An editor, through the use of his editing terminal, may call up a story entered into the data base storage from either one of his writers or from one of the data input sources DIS. In this case, the proper keys on the terminal's keyboard will be actuated and the story will be retrieved from the data base storage and supplied under the control of the host computer HC to the terminal requesting the story. The editor will now view the story on his display screen and make whatever editing corrections he requires, using the proper editing controls on the keyboard. Once the edited story has been completed, the editor will actuate a send key on the keyboard and the edited story will now be stored at the data base storage but in a different location from the unedited story. An edited story located at the data base storage will, under computer control, be supplied to one or more of a plurality of data output devices DOD. Suitable output devices known in the art include typesetters, papertape punches, printers and modems. Systems of the nature described thus far are well known in the art and have been installed in several newspaper facilities. No further description of the overall system will be presented herein unless it has particular concern with respect to the invention.

Video Display Terminal (General)

Figure 2:
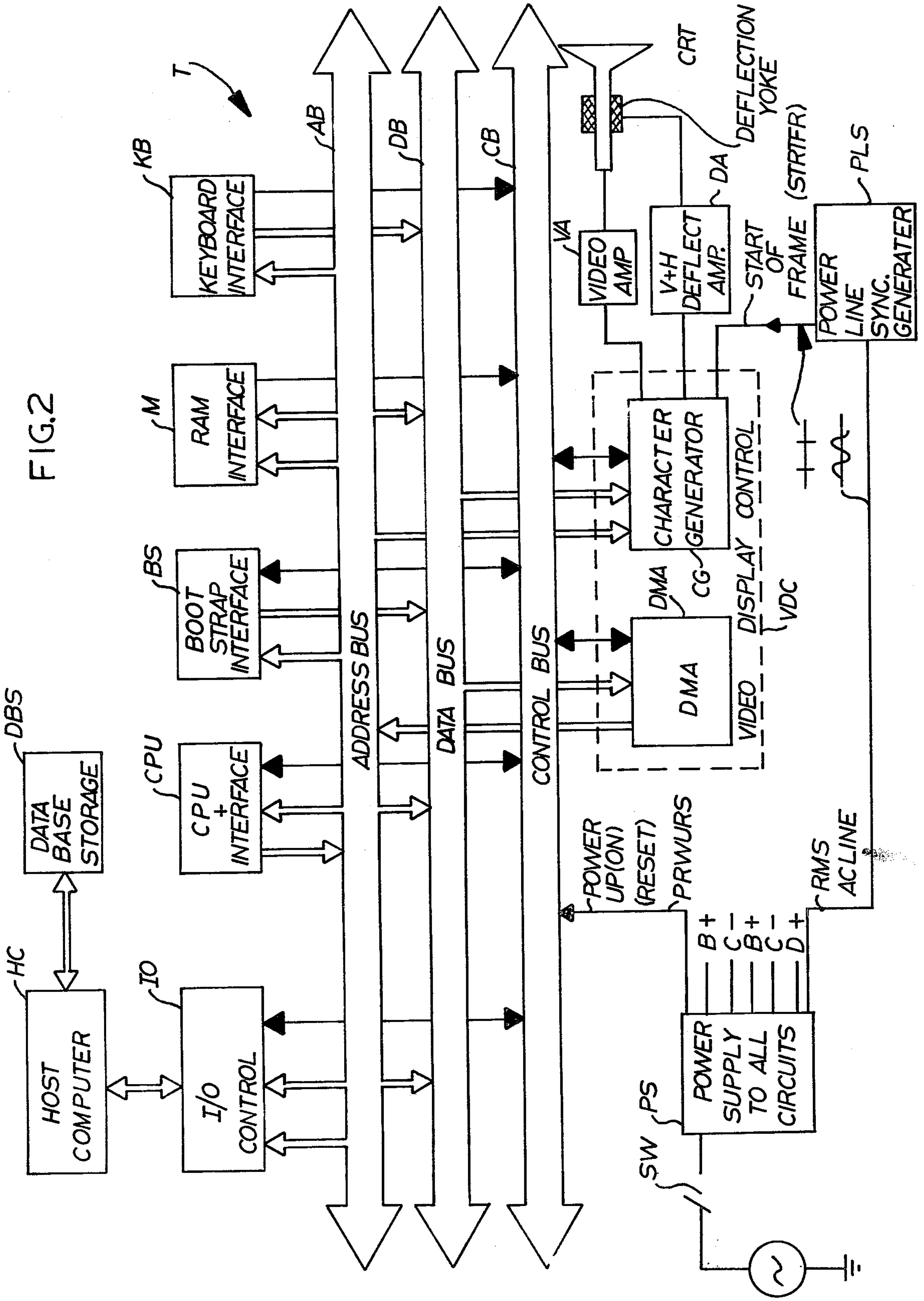
FIG. 2 is a schematic-block diagram illustration of a video display terminal in accordance with the present invention.

Reference is now made to FIG. 2 which illustrates a block diagram of a video display terminal in accordance with the present invention and which may be used in a system such as that illustrated in FIG. 1. The terminal T of FIG. 2 is a processor-driven terminal employing a common bus structure. The bus structure may be divided into an address bus AB, a data bus DB and a control bus CB. By way of example only, the address bus may be a 16 bit bus and the data bus may be an 8 bit bus. An interface to the host computer HC is obtained with an input/output control IO. The input/output control IO, in a conventional manner, communicates with the address bus, the data bus and the control bus. Also connected to the common bus is the central processing unit CPU, a bootstrap memory BS, a main random access memory M, a keyboard KB, and a video display control VDC which includes a direct memory access circuit DMA and a character generator CG.

The character generator communicates in a conventional fashion with a display means in the form of a cathode ray tube CRT by way of a suitable video amplifier VA and vertical and horizontal deflection amplifying circuitry DA. A power supply circuit PS is activated upon closure of a switch SW to receive A.C. line power. The power supply provides the various DC level signals required by the circuitry as well as an output which carries an AC line signal to a power line synchronization generator PLS. For example, the AC line signal may be a six volt RMS signal. The power line synchronization generator PLS provides output pulses that are synchronized to the AC line signal, as shown by the waveforms in FIG. 2, and this provides output pulses to the character generator to provide a command for start of frame (STRTFR). A control output is also obtained from the power supply circuit PS to provide a power-up signal (PWRURS).

A general description of the operation of the terminal is now presented. As the editor or writer commences use of the terminal he will actuate a power-on switch SW which will raise the power-up line PRWUPS. This is routed to the control bus and from there to the processor CPU. This causes, under program control, an interrogation of the bootstrap memory BS which then supplies to the data bus DB some data in the form of a terminal identification. The bootstrap memory is a programmable read only memory or other non-volatile storage facility. The terminal identification is supplied by the data bus DB to the host computer HC by way of the input/output control IO. The host computer will now download program instructions to the terminal for storage in the main memory M. The terminal is now programmed to perform its intended operation, i.e., such as a sports editor terminal. In such case, the editor will now employ the keyboard KB for transmitting a code to the host computer to ask for a particular story. Under the program control, the information provided by the keyboard KB will appear on the data bus line and then be transmitted by way of the input output control IO to the host computer. The host computer will then retrieve the requested story from the data base storage DBS and supply the story to the terminal. Under program control, the terminal will route the story for storage in the main memory M. At this point, the main memory M will store both program instructions for internal operation of the processor as well as the data representing the text to be displayed on the CRT.

The data characters stored in main memory are read and routed to the character generator where the data characters are decoded to obtain the proper video dot pattern for display on the CRT screen. The main memory is accessed under the control of a direct memory access control circuit DMA. This circuit operates in response to control signals from the character generator CG and fetches data from the memory with the data then being supplied to the character generator by way of a data bus DB. The data received by the character generator is then employed to provide video patterns representative of data characters for display on the cathode ray tube CRT.

Before explaining the various circuits in detail, the following discussion is presented with respect to various blocks illustrated in FIG. 2. For example, the processor CPU serves to execute programs which are downloaded to the main memory M. The processor may take any convenient form of microprocessor such as the Intel Microprocessor Model 8080 and which is described in detail in that company's User's Manual 98-153C dated September, 1975. The reader is referenced to that manual for a complete discussion of the processor. Basically, it takes the form of an 8 bit machine having an 8 bit bidirectional data bus, a 16 bit address bus, and has addressing capability for up to 64,000 8 bit bytes of memory.

The bootstrap memory BS includes a programmable read only memory (PROM). This is a non-volatile storage of a bootstrap program which, when executed by the CPU during the power-up sequence of the terminal, causes transmission of a message by way of the data bus DB to the host computer HC requesting a download of the terminal control program. The downloaded program is stored in the terminal's main memory M which includes storage capacity for the text data to be displayed on the CRT as well as working memory for use by the CPU. The main memory M may take the form of a 16K 8 bit word random access memory.

The character generator converts the received data into a serial video stream which is applied by the video amplifier VA to control the blank/unblank operation of the CRT. A full screen of display may include, for example, 27 lines of 72 characters each. Preferably, a T.V. raster scan technique is employed and which incorporates a vertical raster. The character generator provides to the video amplifier a serial bit stream which corresponds to vertical display raster columns. As will be brought out in greater detail hereinafter, each character is displayed within a 12×15 dot matrix. The dot matrix hereinafter will be referred to in terms of pixels (picture elements). The normal character is 11 pixels wide and with one pixel intercolumn spacing 12 vertical raster scans are required for the display of each of the 72 columns of characters on the screen. The depth of a character field is potentially 15 pixels long. Each data character representative of text information is accompanied by an additional 8 bit word of information which hereinafter is referred to as an enhancement character. The enhancement character causes video modification of the display of the data character. Consequently, the video stream as sent to the video amplifier is enhanced or altered by the character generator as required to achieve the proper modified display.

Figure 3:
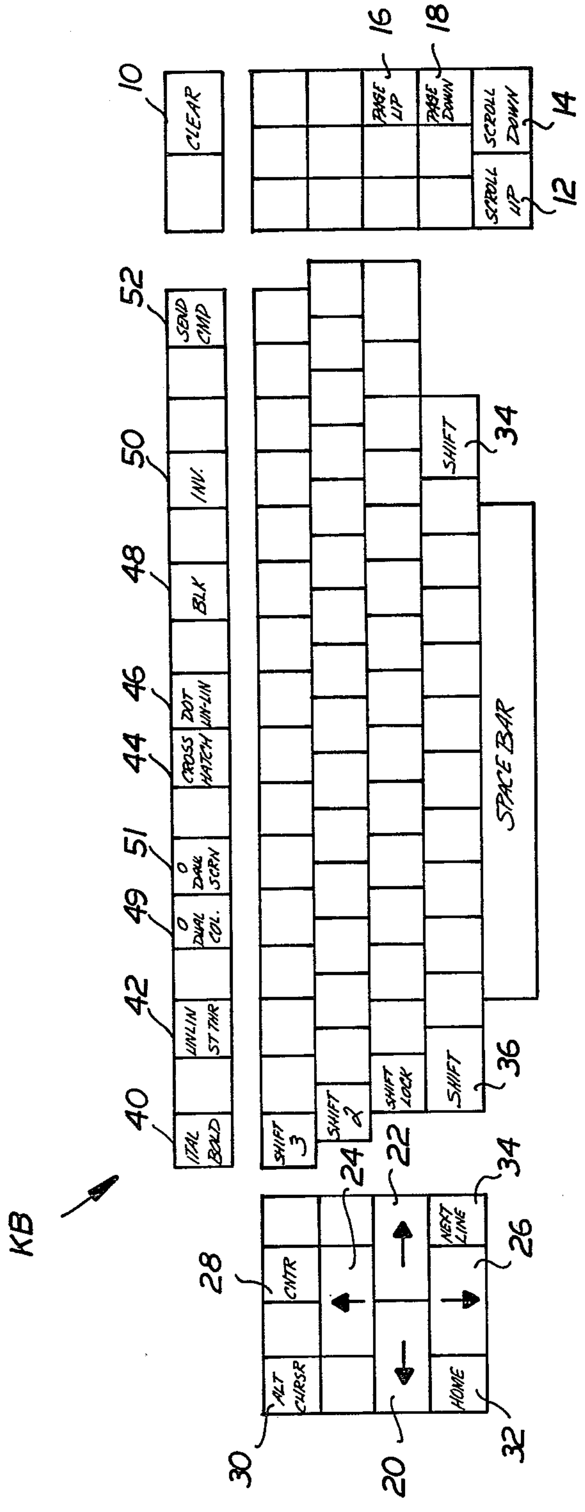
FIG. 3 is a schematic illustration of the keyboard layout for the keyboard of the terminal illustrated in FIG. 2.

The keyboard KB includes a plurality of text entry keys and various indicator lights and a keyboard layout is illustrated in FIG. 3. There may be as many as 105 key switches located on the keyboard and it interfaces to the CPU such that presentation of the pressed key codes to the CPU is on an interrupt basis in a manner well known in the art. Most of the keys are conventional in the art and only mention here will be made. Thus, the main keyboard includes a group of text entry keys for use in entering alphanumeric characters. In addition, there are keys to provide shift and shift lock, double and triple shift. The keyboard also includes a plurality of editorial mark-up keys to provide such functions as begin and end command, subformat, new paragraph, flush codes for flushing left, center and right, define block (which is a key that inserts a block marker on the screen and advances the cursor to the next character position). There are also several text display control function keys to provide certain control functions. These include a clear key 10, scroll-up key 12, scroll-down key 14, a page-up key 16, and a page-down key 18. The clear key 10 is used by the operator when he desires to destructively clear all text displayed on the screen from memory. The scroll-up and scroll-down keys 12 and 14 permit the operator to move the active display window on a line basis.

Momentary depression of the scroll up (down) key causes the display text to move up (down) one line on the screen, thereby forcing a line from the top (bottom) of the display to be transmitted to the host computer for storage to allow room for the next contiguous line to be displayed on the bottom (top) line which is received from the data base storage. If the scroll key is held down then the scroll will repeat at a rate of, for example, 10 lines per second until released. When in the dual screen mode, only the text which contains the cursor will be permitted to scroll. The page-up key 16 and the page-down key 18 when actuated cause a page-up (down) operation which causes the next screen (previous) full of text to be displayed.

The cursor control keys are shown on the left side of the keyboard and include a move left key 20, move right key 22, move up key 24, and move down key 26. Each key includes an arrow designating the direction of movement. The cursor controls permit the cursor to be positioned at any one of the possible display character locations on the screen. A momentary actuation of one of the cursor control keys causes a one character position movement of the cursor in the appropriate direction. The alternate cursor key 30 is used when the terminal is in a dual screen mode of operation. For example, during the dual screen operation in which two different stories in two side-by-side columns of text are displayed, editing functions and the like can take place only in that portion in which the cursor is located. Actuation of the alternate cursor key 30 causes the cursor to move from one column to the other column. Actuation of the home key 32 causes the cursor to move to its home position, normally in the upper left hand corner of the text being displayed. The next line key 34 acts as a carriage return on a typewriter in that it causes the cursor to be moved from its current position to the first character position on the line immediately below.

The command keys shown on the upper portion of the keyboard are used in conjunction with a shift key such as key 36 or 38. For example, when the italic-bold key 40 is actuated in the unshift mode it will cause a bold video modification to be used to represent bold type face. In the shifted mode, actuation of the key 40 will cause an italic video modification to be used to represent italic type face. Similarly, in the unshifted mode, actuation of key 42 will cause a video modifier of strike-through to be applied to characters on the display. In the shifted mode actuation of key 42 will cause an underline video modifier. Additional command keys include a cross hatch command key 44 which when actuated will cause a cross hatch enhancement on the character display. Actuation of key 46 will cause a dotted underline enhancement. Actuation of key 48 will cause a blink enhancement to cause the data character at that location to blink. Similarly, actuation of key 50 will cause a video inversion enhancement. These enhancements will all be described in greater detail hereinafter. Actuation of any of these keys causes a unique 8 bit data word to appear on the data bus and stored in an address location in the main memory and it is used by the character generator CG for displaying the appropriate character. The manner in which the character generator and direct memory access circuit operate will be described in detail hereinafter.

A dual column key 49 is used to select and deselect the dual column display mode of a single item. The display modes may not be switched during active display of an item, depression of the dual column key with a take or directory on the screen will have no affect. When the dual column key is struck when the terminal is inactive, the terminal switches into the dual column display mode (two columns of up to 27 lines of up to 35 characters per line), illuminates a dual column indicator, clears the screen and homes the cursor. If the dual column mode is active and the operator wants to switch to normal display mode, the operator ends any active display item and depresses the dual column key again which extinguishes the indicator and reverts the terminal to normal display mode.

When dual column mode is active, any directory or take which is called to or begun on the terminal is displayed in two 35 character per line columns with the first line (which may be text or header information) in the top left column line. Subsequent thirty-five character lines fill the remainder of the left hand column to the bottom of the screen and the right hand column from the top of the screen to the bottom. Thus, the bottom line of the left column is adjacent to (i.e., the line above) the top line of the right column and they are so treated during any editing, display or cursor manipulations.

The dual screen key 51 is used to select and deselect the dual screen display mode, which permits simultaneous display of two takes in a vertically split display manner. Since display modes may not be changed during active display of an item, depression of the dual screen key with a take or directory on the screen will have no effect. When the dual screen key is struck when the terminal is inactive, the terminal switches into the dual screen mode, clears the screen, homes the cursor (upper left) and illuminates the dual screen display indicator. The next depression of this key when there are no items actively displayed will revert the display to normal mode and extinguish the indicator. When the editor fetches the first item to be displayed in active dual screen mode it is placed on the left half of the screen with the line lengths no greater than 35 characters, with the cursor placed in the home (upper left hand corner) position on that take. Protected text in head lines and formats is broken at the line length without regard for word wrapping in order to preserve the integrity of the protected format. Once the left hand item is thus activated, the editor may use the alternate take key to activate the right hand column so that he may fetch or begin a second time. He may then proceed to control and edit the text in either column. The take in which the cursor is located is defined as being "active". All normal text and function keyboarding done by the editor is in the active take. Additional command keys include a send command key 52 which is used to initiate transmission of data to the host computer HC.

Processor

Figure 4:
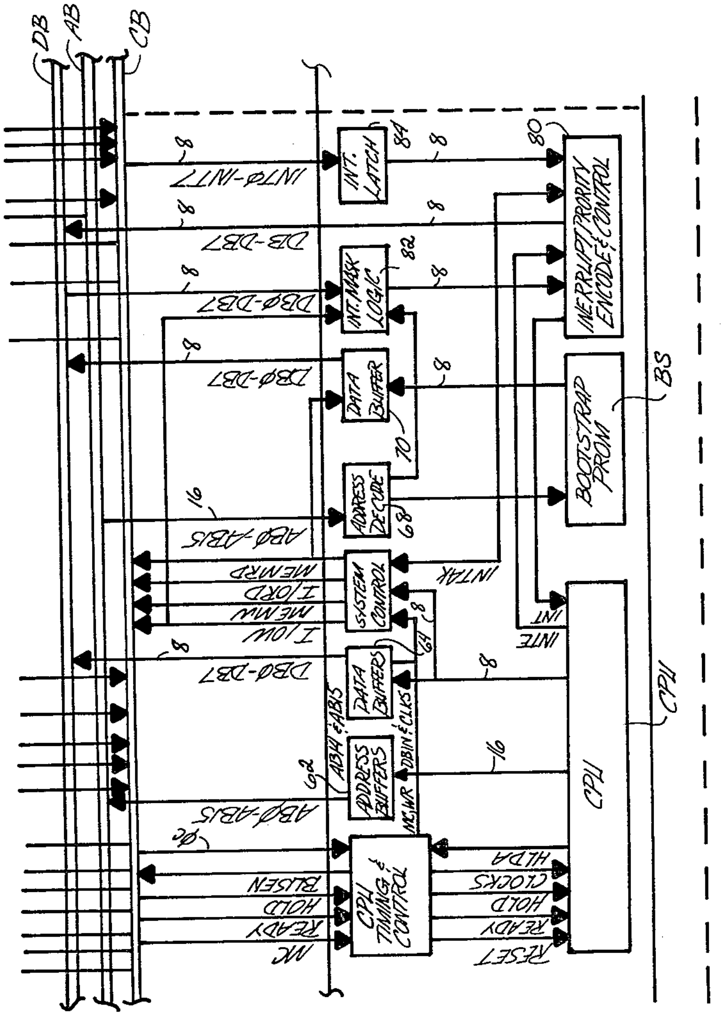
FIG. 4 is a schematic-block diagram illustration of the CPU and interface circuitry.

The central processing unit CPU is shown in greater detail in FIG. 4. This is a general purpose processor and may take the form of an Intel 8080A processor. This processor and its interfacing with the common bus may be understood by reference to Intel's System User's Manual 98-153C dated September, 1975. However, to facilitate an understanding of the CPU, reference should now be made to Table I which describes the function of the CPU inputs and outputs. Several of the descriptions refer to internal timing periods.

TABLE I $A_{15}A_0$
(output three-state)
ADDRESS BUS; the address bus provides the address to memory (up to 64K 8-bit words) or denotes the I/O device number for up to 256 input and 256 output devices. $A_0$ is the least significant address bit.

$D_7$–$D_0$ (input/output three-state)
DATA BUS; the data bus provides bi-directional communication between the CPU, memory, and I/O devices for instructions and data transfers. Also, during the first clock cycle of each machine cycle, the CPU outputs a status word on the data bus that describes the current machine cycle. $D_0$ is the least significant bit.

SYNC (output)
SYNCHRONIZING SIGNAL; the SYNC pin provides a signal to indicate the beginning of each machine cycle.

DBIN (output)
DATA BUS IN; the DBIN signal indicates to external circuits that the data bus is in the input mode. This signal is used to enable the gating of data onto the data bus from memory or I/O.

READY (input)
READY; the READY signal indicates to the CPU that valid memory or input data is available on the data bus. This signal is used to synchronize the CPU with slower memory of I/O devices. If after sending an address out the CPU does not receive a READY input, the CPU will enter a WAIT state for as long as the READY line is low. READY can also be used to single step the CPU.

TABLE I-continued

WAIT (output)
WAIT, the WAIT signal acknowledges that the CPU is in a WAIT state.

WR output
WRITE, the WR signal is used for memory WRITE or I/O output control. The data on the data bus is stable while the WR signal is low (WR = 0).

HOLD (input)
HOLD; the HOLD signal requests the CPU to enter the HOLD state. The HOLD state allows an external device to gain control of the CPU address and data bus as soon as the CPU has completed its use of these buses for the current machine cycle. It is recognized under the following conditions:
the CPU is in the HALT state.
the CPU is in the T2 or TW state and the READY signal is active.

As a result of entering the HOLD state the CPU ADDRESS BUS ($A_{15}$-$A_0$) and DATA BUS ($D_7$-$D_0$) will be in their high impedance state. the CPU acknowledges its state with the HOLD ACKNOWLEDGE (HLDA) pin.

HLDA (output)
HOLD ACKNOWLEDGE:
the HLDA signal appear in response to the HOLD signal and indicates that the data and address bus will go to the high impedance state. The HLDA signal begins at:
T3 for READ memory or input.
The Clock Period following T3 for WRITE memory or OUTPUT operation.
In either case, the HLDA signal appears after the rising edges of $0_1$ and high impedance occurs after the rising edge of $0_2$.

INTE (output)

TABLE I-continued

INTERRUPT ENABLE; indicates the contents of the internal interrupt enable flip/flop. This flip/flop may be set or reset by the Enable and Disable Interrupt instructions and inhibits interrupts from being accepted by the CPU when it is reset. It is automatically reset (disabling further interrupts) at time T1 of the instructions fetch cycle (M1) when an interrupt is accepted and is also reset by the RESET signal.

INT (input)
INTERRUPT REQUEST; the CPU recognizes an interrupt request on this line at the end of the current instruction or while halted. If the CPU is in the HOLD state or if the Interrupt Enable flip/flop is reset it will not honor the request.

RESET (input)
RESET; while the RESET signal is activated, the content of the program counter is cleared. After RESET, the program will start at location 0 in memory. The INTE and HLDA flip/flops are also reset. Note that the flags, accumulator, stack pointer, and registers are not cleared.

From FIG. 4, it will be noted that the various inputs such as RESET, READY, discussed in Table I are found on the appropriate inputs and outputs to the CPU. The interface to support the CPU includes a CPU timing and control circuit 60, address buffers 62, data buffers 64 and a system control 66. These are all conventional in the art and are components typically employed in conjunction with supporting an Intel 8080 CPU in its interface with the common bus structure. Before describing these components, reference should be made to Table II. This is a signal mnemonic dictionary which is useful not only for an understanding of the signal mnemonics shown in FIG. 4, but those to be used in the remaining figures herein.

TABLE II

| | |
|---|---|
| A** | CPU ADDRESS BIT** (**00 through 15) |
| AB** | ADDRESS BOT** (**00 through 15) |
| ACLSYN | AC LINE SYNC |
| BEN | BUS ENABLE |
| BLINKC | BLINK CLOCK |
| BLKDEC | BLANK (INHIBIT) DECODER |
| BLNKV1 | BLANK VIDEO 1 (SLOW BLANKING) |
| BLNK2 | BLANK VIDEO 2 (FAST BLANKING) |
| BUSEN | BUS ENABLE (CPU IN HOLD MODE) |
| CCOL** | CHARACTER COLUMN** (**=34,62, etc.) |
| CCOLB* | CHARACTER COLUMN CTR BIT* (*=0 through 6) |
| CE* | CHIP ENABLE* (*=0 through 3) |
| CEW | CHIP ENABLE WRITE |
| CGDFET | CHARACTER GEN DATA FETCH MEMORY CYCLE |
| CHCOD* | CHARACTER DATA CODE (LATCHED) BIT* (*= 0 through 7) |
| CHDAT* | CHARACTER DATA* (*=0 through 7) |
| CLK INT | CLOCK INTERRUPT REGISTER |
| CNTRAC | COUNT REFRESH ADDRESS AND ACCESS CNTR |
| CNTVAC | COUNT VECTOR ADDRESS CNTR |
| CNTVTA | COUNTER VECTOR TABLE ADDRESS CNTR |
| CS* | CHIP SELECT* (*=0 through 3) |
| CTVRAC | COUNT VECTOR RAM ADDRESS CNTR |
| D* | CPU DATA BUS BIT* (*=0 through 7) |
| DAFEMD | DMA IN DATA FETCH MODE |
| DAOVEF | DATA OR VECTOR FETCH MODE |
| DATAFE | DATA (OR VECTOR) FETCH MEMORY CYCLE |
| DATFE2 | SECOND DATA (OR VECTOR) FETCH |
| DB* | DATA BUS* (*=0 through 7) |
| DBIN | DATA BUS INPUT (TO CPU) MODE |
| DCFEVE | DUAL COLUMN FETCH VECTORS |
| DFVACR | DATA FETCH VECTOR ADDRESS CNTR LOAD |
| DI* | RAM DATA INPUT BIT* (*=0 through 7) |
| DMACT | DMA ACTIVE |
| DMAENA | DMA ENABLED BY CPU |
| DO* | RAM DATA OUTPUT BIT* (*=0 through 7) |
| DUALCO | DUAL COLUMN MODE |
| DVAL | DATA VALID FROM MEMORY |

TABLE II-continued

| | |
|---|---|
| DVALAX | DATA VALID (DOUBLE BUFFERED) |
| DVALAXX | DATA VALID (BUFFERED) |
| ENAVAC | ENABLE VECTOR ADDRESS CNTR TO BUS |
| ENAVTA | ENABLE VECTOR TABLE ADDRESS TO BUS |
| FEDATA | FETCH DATA |
| H. CTR | HORIZONTAL CENTER (BUFFERED) |
| HCENTR | HORIZONTAL CENTER |
| HOLD | HOLD CPU |
| HRETRC | HORIZONTAL RETRACE |
| HRT | HORIZONTAL RETRACE |
| HWCURS | CURSO VIDEO ENABLE |
| I/OR | I/O READ |
| I/OW | I/O WRITE |
| IMRCLK | INTERRUPT MASK REG CLOCK |
| INT | INTERRUPT CPU |
| INT* | INTERRUPT* (*=0 through 7) |
| INTACK | INTERRUPT ACKNOWLEDGE |
| INTE | INTERRPUT ENABLE |
| KB* | KEYBOARD DATA BIT* (*=0 through 7) |
| LDBYT1 | LOAD VECTOR BYTE 1 |
| LDBYT2 | LOAD VECTOR BYTE 2 |
| LDO | LOAD RAM DATA OUTPUT REG |
| LINE** | LINE** (**=01, 32, etc.) |
| LINE SYNC | AC LINE SYNC |
| LINEB* | LINE BIT* (*=0 through 4) |
| LODVAC | LOAD VECTOR ADDRESS COUNTER |
| MC | MASTER CLEAR |
| MCSWITCH | MASTER CLEAR SWITCH |
| EMECYC | MEMORY CYCLE (ENA MEMRD) |
| MEMRD | MEMORY READ CYCLE |
| MEMW | MEMORY WRITE CYCLE |
| MSTCLR | MASTER CLEAR (BUFFERED) |
| PIXL** | PIXEL DATA BIT** (**=01 through 16) |
| PULLUP* | PULLUP BUX* (*=A,B,C) |
| PWRURS | POWER UP RESET |
| PXCT01 | PIXEL COUNT 01 |
| PXCT17 | PIXEL COUNT 17 |
| PXCT19 | PIXEL COUNT 19 |
| PX0910 | PIXEL COUNT 09 and 10 |
| PX1617 | PIXEL COUNT 16 and 17 |
| PX1819 | PIXEL COUNT 18 and 19 |
| PX1819 | PIXEL COUNT 18 and 19 |
| RDBUFA | READ BUFFER "A" |
| RDBUFF | READ NEXT BUFFER RAM ADDRESS |
| READY | CPU READY |
| RSTVTA | RESET VECTOR TABLE ADDRESS COUNTER |
| RSVRAC | RESET VECTOR RAM ADDRESS COUNTER |
| SELBUS | SELECT COMMON BUS TO VECTOR RAM INPUT |
| SST-1 | STATUS REG STROBE 1 |
| SST-2 | STATUS REG STROKE 2 |
| STRKB* | STROKE BIT* (*=0 through 3) |
| STRK01 | STROKE 01 |
| STRTFE | START (VECTOR) FETCH |
| STRTFR | START OF FRAME |
| S1 | KEYBOARD STROBE 1 (UNSHIFT AND SHIFT) |
| S2 | KEYBOARD STROBE 2 (SHIFT 2 and 3) |
| TIMEQA | DMA TIMING SHIFT REG Q-SUB-A OUTPUT |
| TIMEQ | DMA TIMING SHIFT REG Q-SUB-D OUTPUT |
| UNBLNK | UNBLANK CRT |
| V-S CLK | VERTICAL SYNCH SHIFT REG CLOCK |
| VACB** | VECTOR ADDRESS CNTR BIT** (**=0 through 15) |
| VECB** | VECTOR RAM OUTPUT DATA BIT** (**=0 through 15) |
| VEFEMD | DMA IN VECTOR FETCH MODE |
| VESYNC | VERTICAL SYNC |
| VID EN | VIDEO ENABLE (PROTECTIVE BLANKING) |
| VRID** | VECTOR RAM INPUT DATA BIS** (**=0 through 15) |
| VRT | VERTICAL RETRACE |
| V1 | VIDEO LEVEL 1 (LIGHT) |
| V2 | VIDEO LEVEL 2 (NORMAL) |
| WE | WRITE ENABLE |
| WR | WRITE STROBE |
| WRTVEC | WRITE DATA INTO VECTOR RAM |
| OC | CPU CLOCK |
| OA | PIXEL CLOCK |
| OB | BLANK/UNBLANK CLOCK |

As indicated by the mnemonics shown in FIG. 4, the timing and control circuit 60 receives various signals from the control bus such as master clear and provides basic timing reference with the signals required by the CPU. The timing and control circuit is conventional in the art and may, for example, comprise a modified Johnson counter. The address buffer provides buffering of the 16 bit $AB_0$ to $AB_{15}$ address bits from the CPU to the address bus AB. The data buffer 64 provides buffering for the 8 bit $DB_0$ to $DB_7$ data bits going from the CPU to the data bus DB or from the data bus DB to the CPU. The system control 66 provides the various system commands under processor control, and includes such system commands as MEMW. These are all transmitted to the control bus CB.

Bootstrap

Also shown in FIG. 4 is the interfacing of the bootstrap memory BS with the common bus. Basically, an address buffer 68 receives a 16 bit address from the address bus AB and this is decoded to, in turn, address a location in the bootstrap memory to obtain data to be transmitted by way of a data buffer 70, when actuated by memory read line MEMRD. An 8 bit data word $DB_0$–$DB_7$ is thus transmitted to the data bus.

Priority Interrupt

Additionally in FIG. 4, there is illustrated a priority interrupt encoder and control circuit 80 which may take the form known in the art such as an Intel 8212. Although the circuitry employed together with its interface with the bus structure will be described briefly herein, the reader may find a more detailed discussion of the circuitry in Intel's System User's Manual 98-153C dated September, 1975. The interface circuitry also includes an interrupt mask logic circuit 82 and an interrupt latch circuit 84. The inputs and outputs are all labeled with the mnemonics discussed hereinbefore. Briefly, an interrupt mask is stored on command from the CPU to enable or disable each of the 8 interrupt inputs (INTO to INT7). The CPU must execute an output instruction to the I/O address of the interrupt mask register with a logic 0 on the data bus DB for each interrupt which is to be enabled. For example, if the CPU outputs 11010110 to the interrupt mask register, interrupts 0, 3 and 5 will be enabled. The enabled interrupts are taken on a priority basis to generate one of the 8 RESTART (RST) instructions. The proper RESTART is latched in and the interrupt priority encoder and control circuit 80 sends an interrupt signal INT to the CPU. The CPU will recognize the signal and reset interrupt enable INTE, disabling further interrupts and generates interrupt acknowledge INTAK.

Input/Output Control

Figure 5:
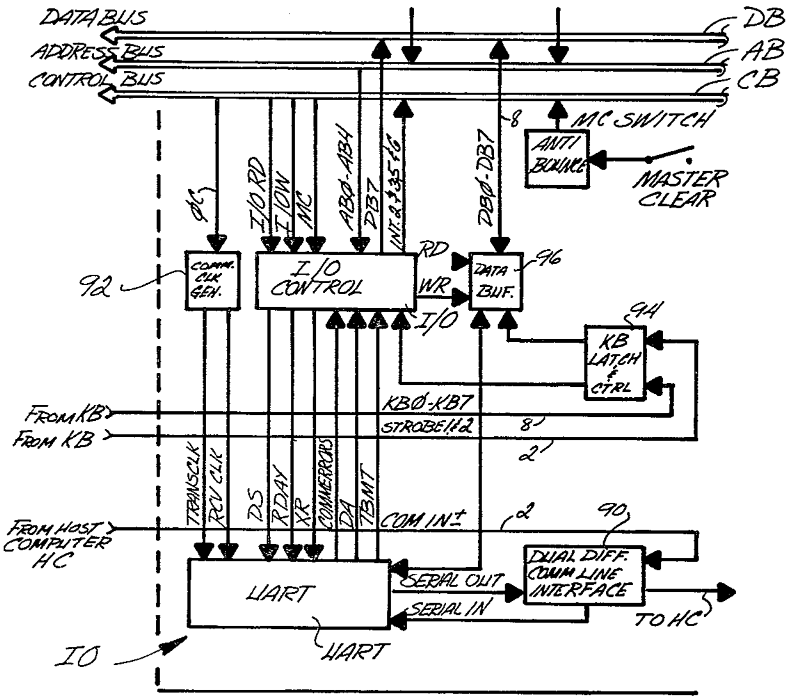
FIG. 5 is a schematic-block diagram illustration of the input/output control circuitry.

The input/output control and its interfacing with the common bus as well as with the host computer is illustrated in FIG. 5. The architecture is relatively conventional and the reader may obtain a detailed understanding of the circuitry by reference to such a source as Intel's Systems User's Manual 98-153C dated September, 1975. Interfacing with the host computer HC is done through a serial data interface including a universal asynchronous receiver/transmitter UART. This is a known component in the art and may take various forms such as the General Instrument AY-5-1013A or equivalent. The mnemonics on the drawings are self-explanatory. The UART status outputs are always enabled. The data available output DA is connected to provide an interrupt, (INT6) to the CPU causing the processor to read data from the UART following receipt of a full character from the host computer. The transmitter buffer empty line TBMT is raised to provide an interrupt to interrupt five of the CPU, informing the processor that the UART is free to accept data. Parity error, framing error and overrun status bits are logically or'd and enabled to the data bus on command from the CPU. Consequently, the CPU can check the status of the UART by reading the appropriate input port. A logic "0" return to the CPU from the status port indicates an error. Consequently, serial data from the host computer is inputted through a dual differential communication line interface 90 which serves in a conventional manner to input serial data into the computer and take the serial data from the UART and interface it to the host computer HC. A communication clock generator 92 receives the system clock Oc and provides both a transmission clock as well as a receive clock for the UART.

In the interface circuitry of FIG. 5, key codes are received from the keyboard and are latched at a keyboard latch and control circuit 94 along with an interrupt to the CPU (interrupt 3 for unshift and shift level 1, interrupt 2 for shift levels 2 and 3). The processor, as part of the interrupt service routine, reads the proper input/output port to accept the keyboard input. A data buffer 96 buffers parallel data received from the keyboard as well as to and from the UART and to and from the data bus. Additionally, FIG. 5 also shows a master clear switch MC, which when actuated, provides a master clear switch signal MCSWITCH which is routed by way of antibounce circuit to the control bus CB.

Memory

Figure 6:
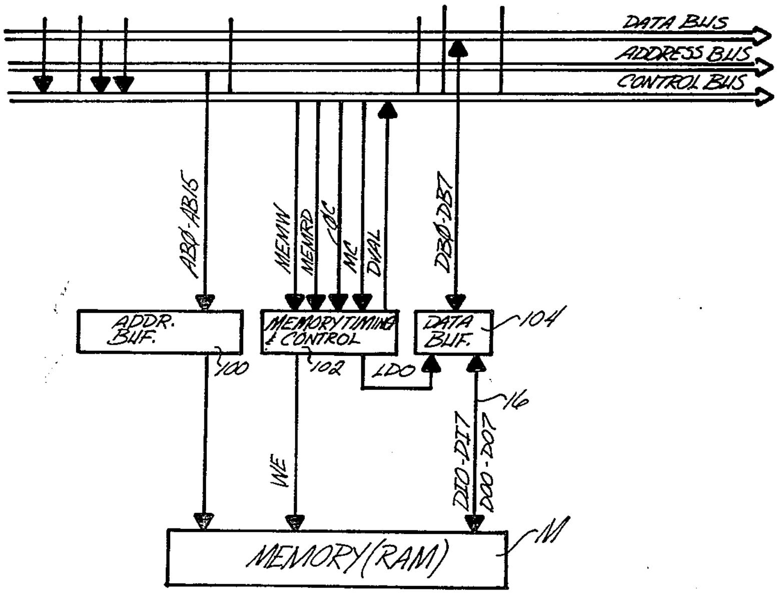
FIG. 6 is a schematic-block diagram illustration of the memory and its interface with the common bus structure.

The main memory M and its interface are illustrated in greater detail in FIG. 6. The memory M may be formed from one or more random access memories known as the Intel 2107B memory elements.

The memory is addressed by 16 bit address data words obtained from the address bus and applied to an address register or buffer 100. A memory timing and control circuit 102 raises its write enable line WE if a write function is to be performed, otherwise a read function is being performed. A data buffer 104 serves to buffer data being read into or out of the memory M. The DVAL signs indicates that data bits may be read from the data bus DB at the occurrence of DVAL. The mnemonics associated with the circuitry of FIG. 6 are self-explanatory and reference may be made to Table II.

Video Display Control

Figure 7:
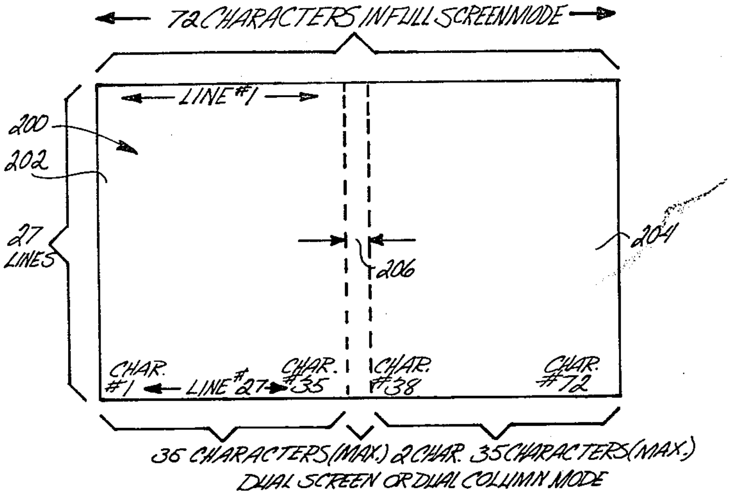
FIG. 7 is a schematic illustration of the display screen of the terminal illustrated in FIG. 2.

As will be recalled from FIG. 2, the video display control VDC includes a direct memory access circuit DMA and a character generator CG, both connected to the common bus in the manner shown. In order to facilitate an understanding of how the character generator operates in conjunction with the direct memory access circuitry DMA a discussion will now be presented as to the manner in which the data to be displayed is stored in the main random access memory (RAM) M. FIG. 7 is a graphical representation of the display screen of the cathodray tube CRT. This presents the display format as well as the terminology which will be used when referring to lines and characters throughout the remainder of the character generator discussion. The display screen 200 is shown in full screen as having 72 vertical columns so that for each character lines, there is a possibility of 72 characters and there are 27 lines of characters possible. As will be discussed in greater detail hereinafter, the terminal has in addition to the full screen mode, a dual screen and a dual column mode. In these latter two modes, the screen is divided in half so that as shown in FIG. 7, the left half of the screen includes 35 characters for each line a two character blank spacing and then 35 additional characters on the right half of the screen. Thus, the screen may be considered as divided into a left column 202 and a right column 204, separated by a two character space 206. In the dual screen mode of operation, two different stories from different data sources may be displayed. In the preferred embodiment, a vertical raster scan is employed as opposed to a horizontal raster scan. The blank spacing 206, which comprises character columns 36 and 37, is used in the dual screen mode for fetching data relative to the text to be displayed on the right half of the screen.

Line Vectors

Data is stored in the main memory M as lines (or half lines) of data characters. A LINE VECTOR refers to the starting RAM address of a line of characters. Thus, for example, with reference to FIG. 7, the first line of characters is represented by line number 1. The line vector that is stored in the main memory is an address representative of the first character in line number 1. These are stored in the RAM in order for the CPU to tell the character generator CG where each line of data starts so that the character generator may fetch the data.

Figure 8:
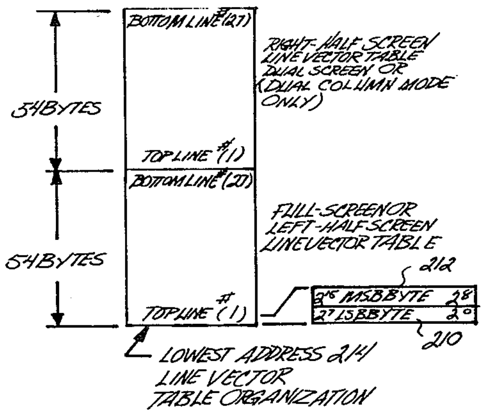
FIG. 8 is a schematic illustration of the line vector table in the main memory.

A line vector table organization is illustrated in FIG. 8. In the preferred embodiment of the invention, each line vector is a 16 bit address. Since the random access memory (RAM) being employed in this embodiment stores only 8 bit words or bytes, then a 16 bit address requires two address bytes. This is illustrated in FIG. 8 as a least significant byte (LSB) 210 and a most significant byte (MSB) 212. The LSB byte is always stored in the lowest address. Line vectors for sequential lines are in sequential addresses, starting with word line number 1 being located in the lowest address 214 (see FIG. 8) in the vector table.

As shown in FIG. 8, when operating in a single column (full screen) mode the first 54 bytes only are read by the character generator. In dual column mode (or dual screen), the first 27 line vectors are fetched for the half-lines on the left-half screen 202 (see FIG. 7). During the two blank character columns 206 at the center of the screen, the last 27 line vectors for the half lines for the right-half screen 204 are fetched.

Display Buffer RAM Organization

Figure 9:
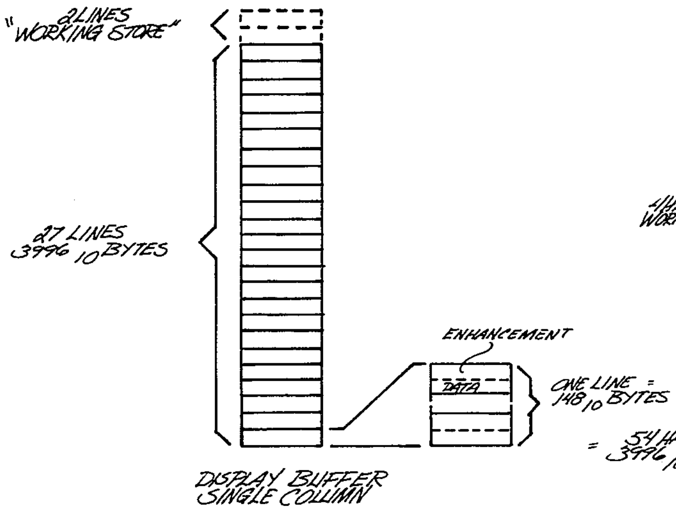
FIG. 9 is a schematic illustration showing the manner in which bytes of data are stored in a display buffer in a single column mode.

Reference is now made to FIG. 9 which is an illustration of the memory map for the display data storage in the main memory M in the single column mode. As shown, there are 29 line buffers of which 27 are active (referenced by the line vector table) and two are working storage. As the terminal is used, data in the buffers and the line vectors change. Depending on the operations performed, the line buffers eventually may be out of the original order and the two working storage buffers may be located anywhere in the 29 lines. The line vectors are constantly updated by the CPU to let the character generator know where the repositioned data is located.

Figure 10:
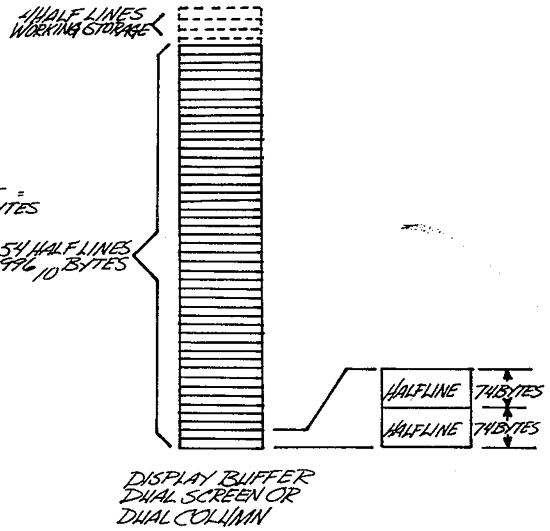
FIG. 10 is similar to that of FIG. 9 but showing the display buffer in the dual screen or dual column mode.

FIG. 10 is a graphical representation of the memory map for display data storage in the main memory M when in the dual screen or dual column mode. In this instance, each line buffer is split in half. This accommodates twice as many lines (i.e., 54 lines) with each containing half as much data (hence there are 54 half-lines). The two working line buffers (of FIG. 9) are split in half (in FIG. 10). Reordering and relocation, as operations require, applies in this case also.

Reference is now made to FIG. 11 which illustrates the character line storage format showing the manner in which each line buffer is organized. The upper portion of FIG. 11 is for the full screen mode and the lower portion is for the dual screen or dual column mode. As shown for both modes, the two lowest addresses of each line contain information required by the CPU and are not accessed by the character generator. The next two bytes are for the left most character (character number 1 or 38 depending on the mode of operation). The line vector table points to the address of the data field of this character. Successive characters across the line follow upwardly to the 35th (in dual screen or dual column mode) or to the 72nd (full screen mode). A spare character is provided for use in overflowing during an insert mode, however, this character is not read by the character generator.

As has been made clear in FIG. 11, each data character has associated with it an enhancement character. FIG. 12 is a graphical representation of the character code layout for each data word. This shows an 8 bit pattern. FIG. 13 shows the layout for an enhancement data character which also includes 8 bits. Each bit position is assigned to one of the enhancements; namely, dashed underline, cross hatch, strike-through, underline, blank video, italics, bold video and inverse video. An enhancement will take place if the binary level in the enhancement bit position shows a binary "1" signal.

CHARACTER GENERATOR

Figure 14:
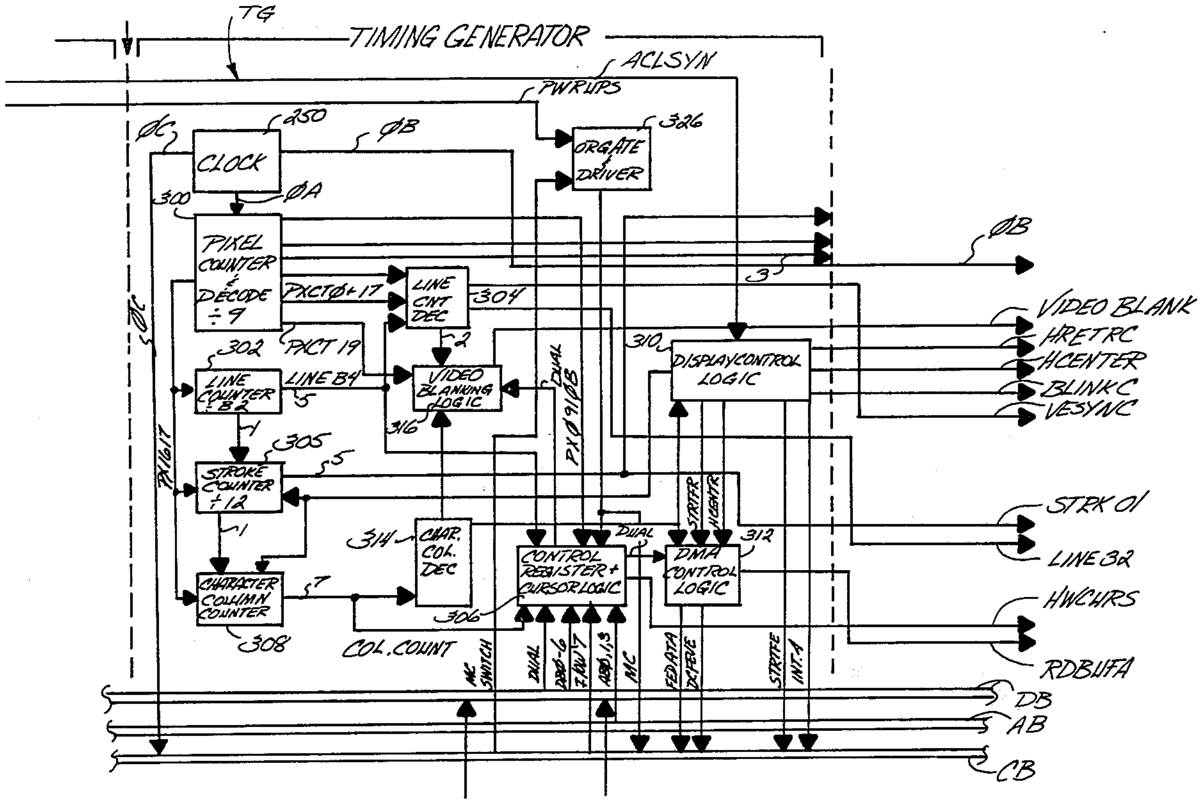
FIG. 14 is a schematic-block diagram illustration of the timing generator circuitry.
Figure 15:
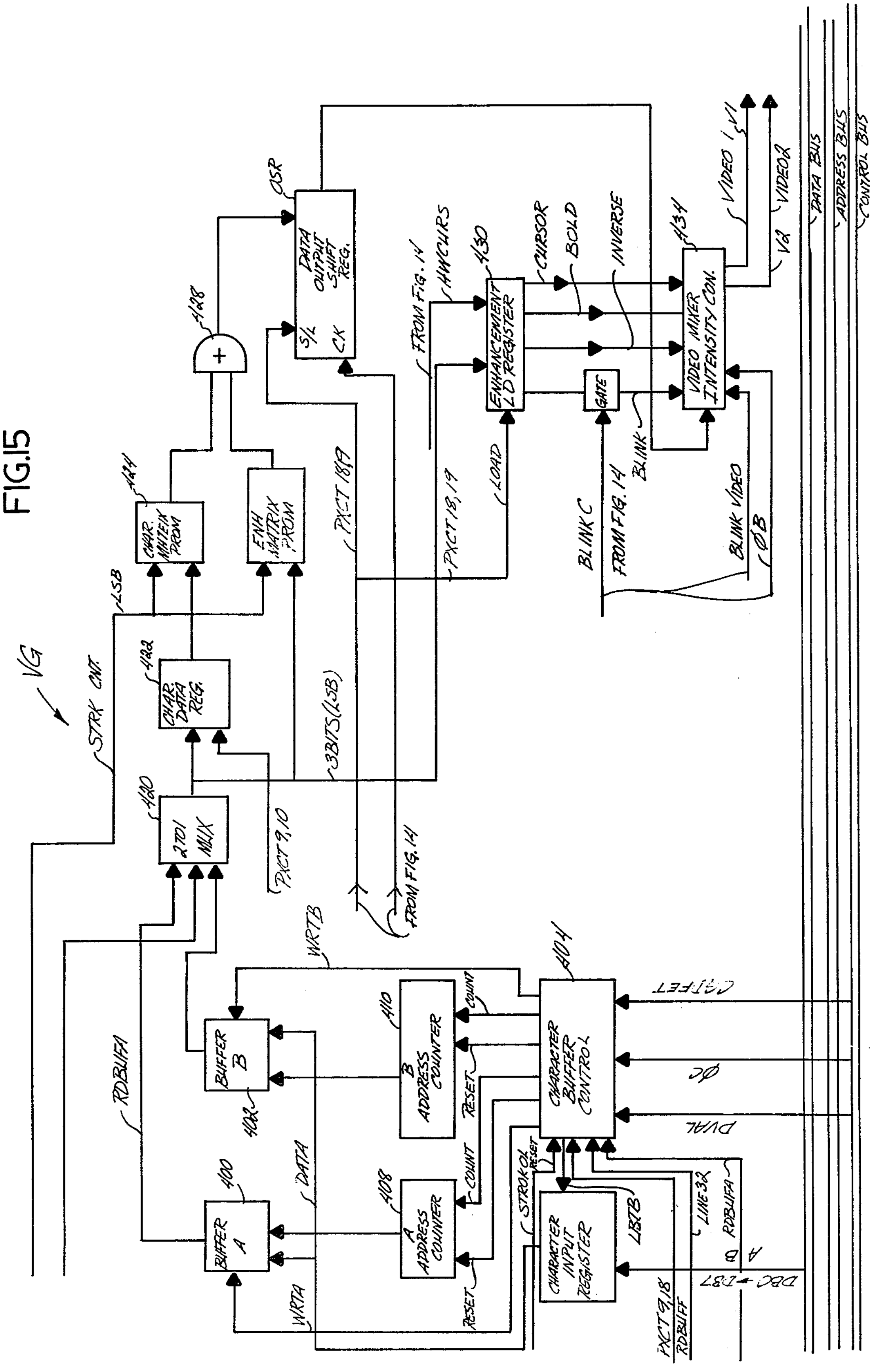
FIG. 15 is a schematic-block diagram illustration of the video generator circuitry.

The character generator CG is illustrated in greater detail in FIGS. 14 and 15. FIG. 14 illustrates that portion which may be considered as the character timing generator TG and FIG. 15 illustrates that portion which may be considered as the video generator VG. Before describing the circuits involved in the timing generator TG and the video generator VG, the following is presented as to the character generator functions. Thus, the character generator serves to:

(1) Generate timing signals for its own internal operations and for other parts of the terminal.

(2) Initiates DMA fetches of data to be displayed from main RAM memory and converts it to CRT unblanking pulses.

(3) Provides synchronizing signals to the display subsystem.

Timing Generator

The timing generator TG as shown in FIG. 14 includes a master clock 250 which serves to provide a phase A clock $O_A$ which is used to establish the pixel rate and is employed in a countdown chain for establishing timing and rates for character generator operation. This same pixel rate but of a different phase, phase B, is employed for controlling the blanking/unblanking operation of the cathode ray tube. The clock rate for clocks $O_A$ and $O_B$ is divided in half to establish a CPU clock $O_C$ which is employed by the processor.

Figure 16:
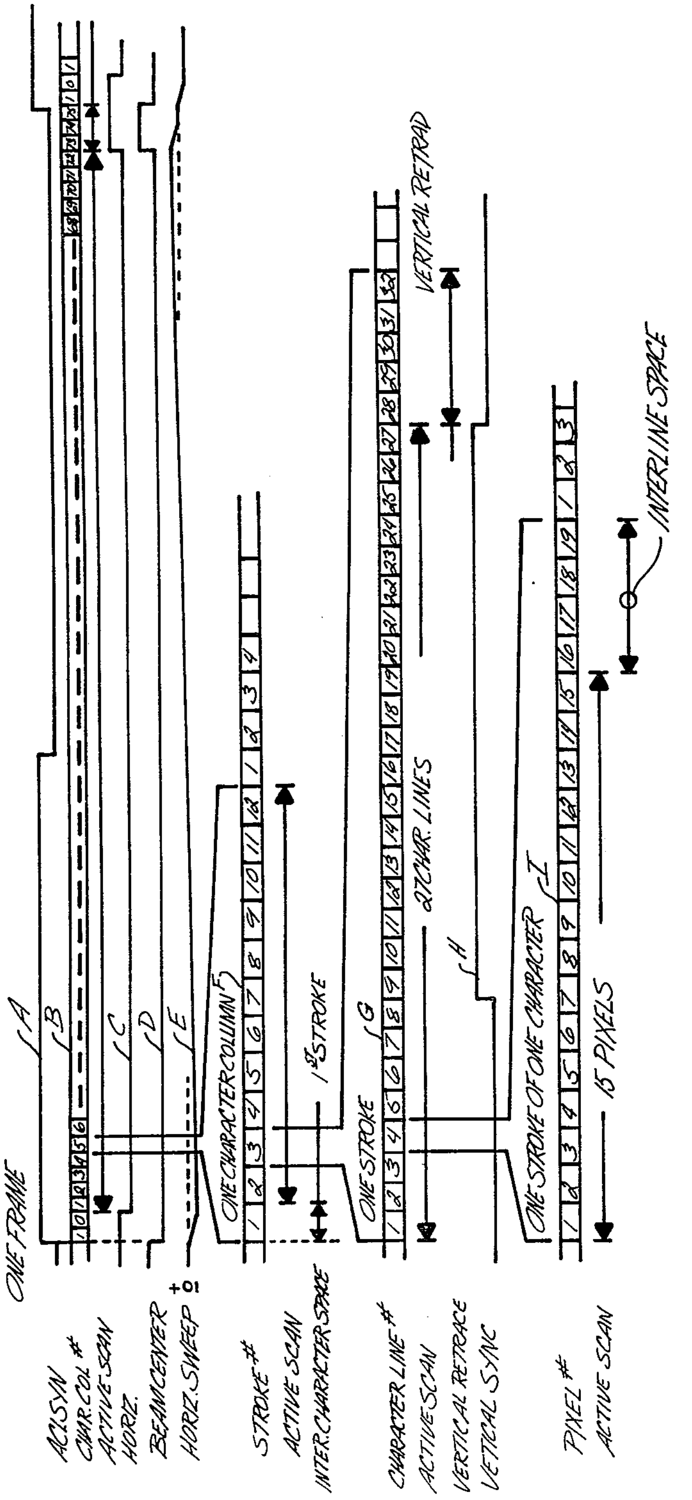
FIG. 16*a* through 16*i* are waveforms useful in understanding portions of the circuitry described herein.

The timing generator TG is best understood with reference to both FIG. 14, which illustrates the circuitry employed, and FIG. 16, which illustrates a timing chart as to the character generator timing functions. The phase A clock is supplied to a pixel counter and decoder 300 which counts down the phase A clock by a factor of 19. It is to be recalled that the characters are formed by vertical raster strokes not horizontal raster strokes. A count of 19 represents 15 pixel counts for the possible 15 dot positions in a vertical stroke for one character together with four interline space pixel counts. The pixel counter 300 may take the form of a typical Johnson Counter modified for odd modulo (19 in this case). Various of the pixel counts are supplied to other circuits by decoding circuitry associated with the counter. Thus, on various pixel counts certain functions are to be controlled and these will be brought out in the discussions which follow.

Each time the pixel counter 300 counts 19 clock pulses from the $O_A$ clock, one stroke of one character has been accounted for (see FIG. 16). This is outputted to a line counter 302 which counts character lines (in a vertical direction). As shown in FIG. 16*g* there are a total of 27 active character lines with character lines 28, 29, 30, 31, and 32 being reserved for the vertical retrace time. The status of the line counter 302 is supplied to a line count decoder 304 and to the cursor logic of the control register 306 (see FIG. 17). As seen in FIG. 16, the line count decoder 304 produces a vertical synch signal VESYNC upon the line counter attaining a count of 9 and this continues through a line count of 27. The line counter which, may take the form of a free running divide by 32 counter, identifies which character line within the stroke is in progress. The line counter is clocked by the leading edge of pixel count PXCT16 so that it is working ahead (in time) of the pixel counter 300. This provides sufficient time for the logic circuitry so that signals are changing only during blank pixels between lines and they are stabilized by the time that the unblanking occurs again.

Each time the line counter attains a count of 32, it provides a count signal to a stroke counter 305 which serves to keep track of which stroke is in progress during the generation of a character. Since there are 12 strokes per character (11 active strokes and 1 inter-character space stroke) this counter divides the count signals from the line counter by a factor of 12. The first stroke count STRK01 represents an unused stroke between characters since unblanking does not normally occur until stroke 2. However, the stroke count STRK01 is relayed to a character buffer control circuit in the video generator for control purposes as will be described in greater detail hereinafter. The stroke counter will continue to count as the line counter 302 counts lines 28 through 32 so the stroke counter is always working ahead to allow for propagation delays. The stroke counter carry is obtained from stroke count number 12 which sets up the counter to preset to all zeros on the next pixel count pulse at pixel count PX1617. This also activates a character column counter 308 which is incremented by one count each time the stroke counter counts 12 strokes. Thus, as shown in FIG. 16*f* one stroke includes 32 character lines and one character column includes 12 strokes. The stroke position is kept track of by the stroke counter whereas the character column position (see FIG. 16*b*) is kept track of by the character column counter 308.

Both the stroke counter 305 and the character column counter 308 are reset or initialized to a count of zero at AC line synch time ACLSYN. However, as shown in FIG. 16*a* and 16*b*, the character column counter will continue to count past character column 73 and is not reset until the next occurence of the AC synch signal ACLSYN. At a character column count of 73 (see FIG. 16*b*) a horizontal retrace signal is produced and a horizontal beam center signal is produced (see FIGS. 16*c* and 16*d*). The horizontal beam center signal (FIG. 16*d*) causes the beam of the CRT to be returned to the center of the screen. The leading edge of the horizontal retrace and the beam center signal initiates a resetting of the horizontal sweep ramp signal, as is seen in FIG. 16*e*. This ramp signal stabilizes at the center of the tube (zero diflection, zero current) and then decreased along its retrace slope upon a character column count of 1–10. A character column 1, it will then increase smoothly through character column count 72.

Figure 17:
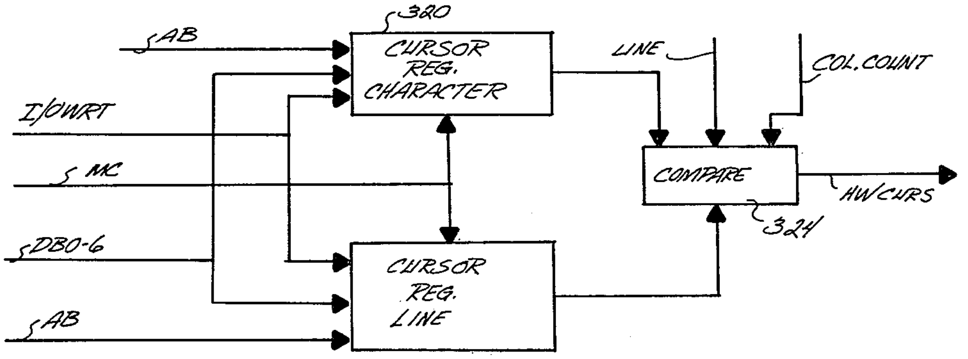
FIG. 17 is a schematic-block diagram illustration of the cursor logic circuitry illustrated in FIG. 14.

The column count provided by counter 308 is supplied to the cursor comparator circuit located in the cursor control circuitry (see FIG. 17). The count is also supplied to a character column decoder circuit 314 which supplies information as to the character column in progress to a display control logic circuit 310 as well as to a direct memory access control logic circuit 312. The display control logic produces the horizontal retrace HRETRC and beam center signal HCENTER to produce the control signal illustrated in FIG. 16*d* in response to a character column count of 73, −1 and $1_o$. An additional function obtained from decoding a character column count of 73 is to initiate a blink clock BLINKC which may be used with some functions and this is obtained by providing a signal in synchronism with the horizontal center signal HCENTER but at a lowered frequency such as with a divide down by 32 to obtain a blink frequency. This is done internally of the display control logic with a divide by 32 counter circuit.

Additionally, the display control logic circuit 310 upon receipt of the AC line synch signal ACLSYN initializes or resets both the stroke counter 305 and the character column counter 308. Also, just after initializing or resetting counters 305 and 308, the display control logic circuit 310 initiates a vector fetch operation by raising its start fetch control line STRTFE which is supplied to the control bus CB. During dual screen, DMA control logic also provides a dual screen fetch vector signal DCFEVE which initiates a vector fetch but does not reset the column counter 308. In addition, display control logic supplies a start frame signal STRTFR which is supplied to the DMA control logic circuit 312. This start frame signal is best illustrated, for example, in FIG. 18*b*. The display control logic 310 turns off the horizontal center signal HCENTER at completion of character column count 73 (see FIG. 16) and this allows the beam (blanked) to retrace during the next two character column counts (C COL-1 and C COL 1). At character count C COL 0 (just before the first unblanked column), the display control logic turns the horizontal retrace signal HRETRC off permitting the horizontal sweep ramp signal to start. At character column count C COL 73, both the horizontal retrace and center are turned on, completing the cycle. Additionally, an interrupt to the CPU is generated this time (at CCOL 73) and this is INT4 which is supplied by the display control logic circuit 310 to the control bus. This is done in synchronism with the AC line synch ACLSYN signal.

The control register 306 is loaded by an I/O write command I/OW from the CPU and of the bits obtained from the data bus there are only two active bits. Bit 0 when in a binary "1" level is a command for single column and when at a "0" level is a dual column command (dual column mode and dual screen mode are considered the same by the character generator). When data bit 1 is at a binary "1" level this is representative of a command to blank the screen and when at a "0" level is a command to unblank the screen. This information is supplied by the control register 306 to the video blanking logic circuit 316 which then outputs a video blank command as required. The video blanking logic circuit 316 produces this video blank signal whenever it detects pixel counts 17, 18 and 19, line counts 28 through 32, character column counts CCOL 73 through 00 as well as character column counts CCOL 36 and 37 during the dual column mode of operation. Consequently, its inputs are taken from the line count decoder 304, the pixel count decoder portion of pixel counter 300 and from the character column decoder 314 and an input from the control register referred to as DUALCO representing that the video is to be blanked during columns 36 and 37 during the dual column mode.

The cursor logic circuitry portion of the control register 306 is illustrated in greater detail in FIG. 17. This circuitry includes two independent CPU loaded input/output ports or registers 320 and 322. They are loaded on an I/O write command and are cleared on a master clear command. The data bits are written into these registers when addressed from the address bus on an I/O write command. Register 320 is loaded with data representative of the character position of the cursor whereas register 322 is loaded with data representative of the line position of the cursor. This information is compared with the actual line count as well as the actual character column count by means of a comparator 324. When the line count compares with the cursor register line count and the character column count compares with the cursor register character count then the comparator circuit 324 raises its HWCURS signal which enables cursor video generation.

A master clear signal MC is raised and supplied to the control bus by an OR GATE 326 whenever it detects either a power up signal PWRUPS or a master clear switch closing MCSWITCH (see FIG. 5).

Figure 18:
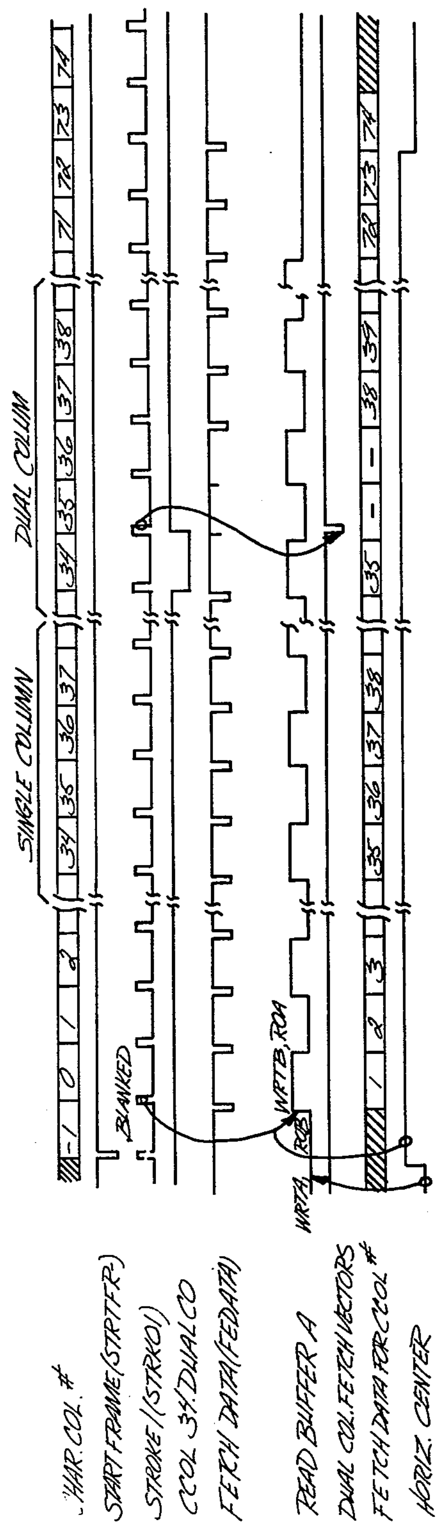
FIG. 18*a* through 18*i* are waveforms useful in describing both single and dual column operation.

Direct memory accesses are made during the start of each character column. The waveforms of FIG. 18 are useful in understanding the DMA control logic circuit 312 and reference should be made thereto. At the beginning of each frame (C COL-1) a vector fetch cycle is started at the lowest address of the vector table (see FIG. 8) in response to a start frame signal STRFR provided to the control bus CB by the display control logic circuit 310. During the first character column of a frame, the STRKD1 signal is blanked. Consequently, when the start frame signal STRTFR is provided by the display control logic circuit 310 to the DMA control logic circuit 312, the latter does not provide its fetch data signal FEDATA. However, for the remaining character columns, each time a character column is started the stroke counter count STKR01 will not be blanked and the DMA control logic circuit 312 will provide a fetch data signal FEDATA (see FIG. 18*b, c,* and *e*). Also with this first fetch data signal, the DMA control logic 312 raises its read buffer A line RDBUFA which commands that the first data fetch be loaded into buffer B within the video generator (to be described hereinafter). As will be seen, whenever the read buffer A line RDBUFA is raised this signifies that buffer B is being loaded and buffer A is being read. When this line is lowered, buffer A is being loaded and buffer B is being read (see FIG. 18*f*). When the next fetch data pulse FEDATA is produced, data is read from buffer B while data is loaded into buffer A. This process will continue as shown in FIG. 18 until character column 73.

FIG. 18 also shows the operation that transpires in the dual column or dual screen mode of operation as it affects character columns 34 through 38. When the character column counter contains a count of 35 when operation is in a dual column mode, then the DMA control logic circuit 312 responds by not producing a fetch data signal FEDATA (see waveforms 18*c* and 18*e*). Consequently, no fetched data signal FEDATA is produced for columns 36 and 37. The fetch data signals resume with character column count 37 through character column count 73. During this inhibited period, vectors are fetched for the right side of the screen as will be described in greater detail hereinafter.

From FIG. 18, it will be noted that during a particular character column count, data is fetched for the next column. Thus, for example, during a count of 34, data is fetched (compare FIGS. 18*a* and 18*h*) for column 35. In the dual column mode, during column counts 35 and 36, no data is fetched for columns 36 and 37. At the start of character column count 35, a fetch vector for dual column signal DCFEVE is provided by the DMA control logic 312 to initiate fetching of vectors for the right side of the screen. During dual column or dual screen mode, character columns 36 and 37 are blanked while the vectors are being fetched for the right side of the screen.

Video Generator

The character generator CG (FIG. 2) as discussed previously includes both the timing generator TG (FIG. 14) as well as a video generator VG which is illustrated in FIG. 15 to which attention is now directed. The video generator receives and stores character data obtained from the main memory M and accesses this data and converts it to a time sequence of CRT unblanking pulses. As will be described in greater detail hereinafter, the direct memory access circuitry DMA responds to a fetch data signal FEDATA outputted by the DMA control logic 312 to, in turn, provide data for the next vertical column of data characters to be displayed on the display screen. This vertical column of data characters includes 27, 8 bit character codes for the 27 lines in a column together with 27, 8 bit enhancement codes, each associated with one of the data characters. The 54 bytes thus described are loaded into either an A buffer 400 or a B buffer 402 in the video generator VG (see FIG. 15). The decision as to which buffer receives the data is based on the status of the read buffer A signal RDBUFA. This is a signal obtained from the timing generator TG and was discussed hereinbefore with reference to FIG. 18*f*. When the signal is raised, a column of data is loaded into the B buffer while a previously loaded column of data is being read from the A buffer.

A character buffer control circuit 404 includes logic circuitry which responds to the level of the read buffer A signal RDBUFA and when the signal is high it raises its write B line WRTB which places buffer B 402 in a write mode. When the signal is low, the buffer control 404 raises its write A line which places buffer A 400 in the write mode in response to a DVAL signal and a CGDFET signal. Whenever buffer A or buffer B is in its write mode, data in the form of an 8 bit word taken from a character input register 406 is written into the buffer at an address obtained from either an A address counter 408 or a B address counter 410. Each character buffer is capable of storing 54, 8 bit bytes of data permitting storage of the 27 data characters and the associated 27 enhancement characters.

During a load operation, the first data character in a column to be displayed is loaded at the lowest address of its associated buffer and then this is followed at the next lowest address by the associated enhancement character. The counters are reset to a zero state in response to the character buffer 404 receiving a stroke 1 count signal STRK01. A clock is now provided by, in effect, ANDing the data valid signal DVAL with the character generator signal data fetch signal CGDFET so as to provide at least 54 clock pulses to increment the A address counter 408 and the B address counter 410. One of the counters 408 and 410 is serving as a read counter while the other is serving as a load counter as determined by the status of the read buffer A signal RDBUFA. Whichever serves as a load counter is reset once the character buffer control circuit 404 receives a stroke number 1 signal STRK01. The read counter is reset by the character buffer control 404 when the latter senses that the line counter 302 (FIG. 14) has attained a count of 32 (this occurs just before each stroke begins). The load counter is counted or incremented by count pulses applied to it from the character buffer control which serves to effectively provide these pulses by ANDing the pulse signals DVAL and CGDFET. The read counter is incremented by the character buffer control 404 upon each occurence of the read buffer signal RDBUFF. This occurs twice per line at pixel counts PXCT9 and 18 (once for a data word and once for an enhancement word). Once the loading is completed, the buffer RAM (buffer A or buffer B) contains, in order, character and enhancement data for lines 1 through 27 of the next character column to be displayed. During the read operation, each of the 27 data characters and the associated 27 enhancement characters for a character column stored in one of the buffers A and B will be accessed 12 times, once for each stroke of a character. Each time a character is accessed from one of the buffers, a stroke of the character is outputted as video along with the appropriate video enhancement for that stroke of the character.

Figure 19:
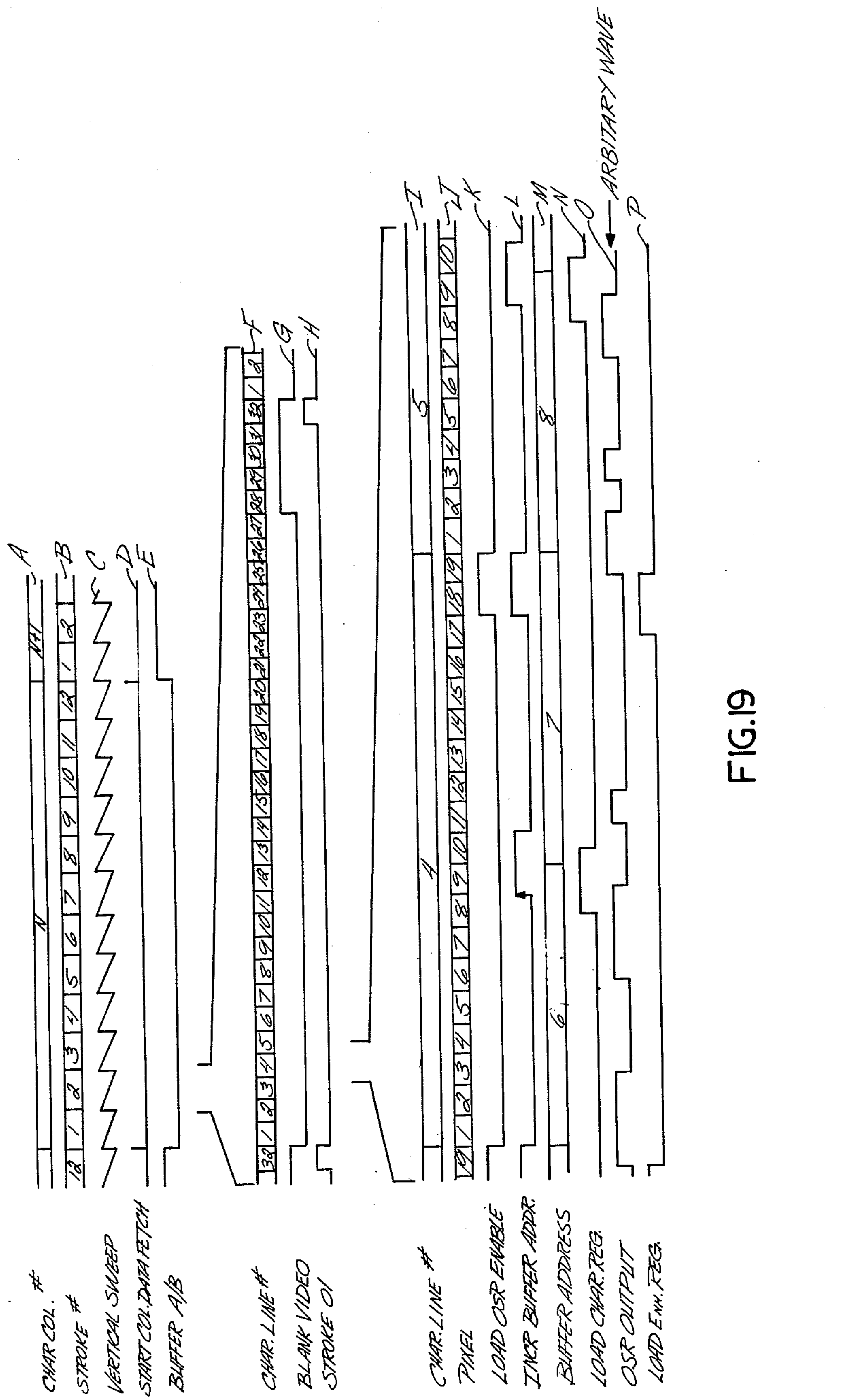
FIG. 19*a* through 19*p* are waveforms useful in describing portions of the circuitry employed herein.

In order to more fully understand this aspect of the description reference should be made to both FIG. 15 as well as the waveforms of FIG. 19. It may be assumed that the read operation commences with a reading of the buffer A 400 and that the read buffer A line RDBUFA is raised. Thus, the A address counter 408 serves as the read counter and is incremented one count on a pixel count of 9 and again at a pixel count of 18. The incrementing of the read address counter is illustrated in FIG. 19L. Starting at the lowest address, the counter addresses the first data character stored in buffer A and this will be followed by the associated enhancement character. Since the read buffer A line RDBUFA has been raised, a 2 to 1 multiplexer 420 is actuated to gate the contents of buffer A to a parallel input/parallel output character data storage register 422. The data character is loaded during pixel counts PXCT9, 10 (see FIG. 19*n*). The 8 bit data character stored in register 422 along with the four least significant bits of the stroke counter output are used as a 12 bit address for addressing a character matrix programmable read only memory (PROM) 424. The four bits from the stroke counter are used as the least significant bits in the addressing of PROM 424 so that this address is incremented each time the stroke counter is incremented.

The character matrix PROM 424 as well as the enhancement matrix PROM 426, to be discussed hereinafter, are preferably programmable read only memories so that they may be programmed in the field by a terminal user. This then will permit the user to choose his own fonts for storage in the character matrix PROM as well as his own enhancement characters for storage in PROM 426.

Each of the PROMS 424 and 426 stores a dot pattern representative of the character to be displayed on the CRT screen. Since each character may be 12 pixels wide by 15 pixels deep, then the dot pattern for each character may include as many as 12–15 bit words, (one word for each vertical stroke through the character field of which the actual active scan length is 15 pixels). This may be best understood with reference to FIG. 20 which shows a character matrix format on a 12×19 matrix. The first stroke count is usually blank and consequently the character is formed in columns 2 through 12. Also, the character has a depth from lines 1 through 15 with lines 16 through 19 being reserved for the interline spacing. As the stroke count increases incremently the PROM 424 or 426 being addressed will provide the dot pattern for the next stroke.

The data character which has been read from buffer A was loaded into the character data register 422 at pixel count PXCT9 and 10 (see FIG. 19*n*). This then serves to address PROM 424 to obtain the stroke pattern for the next data character to be displayed. The vertical stroke of the data character selected will be determined by the least significant bits of the addressing word as obtained from the stroke counter 305 (FIG. 14). These data bits are loaded in parallel through an OR gate 428 into a parallel input serial output shift register OSR. The data is loaded into the output shift register OSR during pixel counts PXCT18 and 19 (see FIG. 19*k*). The enhancement character is applied through the multiplexer 420 (since the read buffer A signal RDBUFA is still high). This is an 8 bit word and the most significant 5 bits are supplied as an address to the enhancement matrix PROM 426. The least significant 3 bits are applied to an enhancement register 430. These three bits respectively call for blink video, inverse video and bold video enhancements (see the enhancement word pattern of FIG. 13). If the bit is of a binary "1" level, then an enhancement will be present. The most significant 5 bits respectively call for underline, strikethrough, cross hatch, italics and dashed-underline enhancements. These five enhancements or rather their dot patterns (in all 32 combinations of the 5 bits) are all stored in the enhancement PROM 426 and are addressed by the 5 significant bits obtained from buffer A together with the 4 bits from the stroke counter, which are used in the least significant bit positions for addressing as in the case of addressing PROM 424. The character being addressed will provide 12 stroke patterns as the stroke count is incremented.

The character generator considers cursor as an additional enhancement and is provided when the cursor signal HWCURS (from comparator 324 in FIG. 17) is raised. When the cursor enhancement is called for this causes normal video to be produced as a solid background for the bold video. Cursor is compatible with all other enhancements except inverse and bold since it is not possible to tell whether the character under the cursor is normal or bold. If a bold enhancement is called for, then this will cause the character data (and PROM generator enhancements) to be displayed in bold video instead of normal video. It will have no effect upon any other enhancements.

When inverse enhancement is called for, this will cause the video to be inverted, so that dark characters appear on a light video background. Normal inverse video will be produced with a light video signal, while bold inverse video will use normal video signal. When the cursor is applied to an inverse character, the background video becomes bold. When the blink enhancement bit is at a binary "1" level, this will actuate a GATE 432 to pass the blink block BLINK-C (obtained from the display control logic 310 in FIG. 14) to the video mixer intensity control circuit 434. This causes the character and any other enhancements to flash on or off at a rate which is in the order of 1/32nd that of the horizontal sweep rate. Reference should now be made to Table III for a better understanding of the variations in intensity of light with whether the video V1 or the video V2 output carries a binary 1 signal.

TABLE III

| VI | V2 | INTENSITY |
|---|---|---|
| 0 | 0 | BLANK |
| 1 | 0 | LIGHT |
| 0 | 1 | NORMAL |
| 1 | 1 | BOLD |

From the above Table, it is noted that when both V1 and V2 are at a binary "0" level, the beam is blanked. If the pattern is 10 then the intensity level is light. If the pattern is 01 then the intensity level is normal. When the pattern in 11, then the intensity level is bold. This is the manner in which the two video outputs V1 and V2 control the intensity level of the display. The two video outputs drive the video amplifier VA (FIG. 2) to control the intensity of the CRT beam in accordance with Table III.

Reference should now be made to Table IV which illustrates the modifications made to each bit obtained from the output shift register OSR dependent upon the inverse, cursor or bold enhancements. Thus, for example, as shown in the first line of Table IV, if the inverse, cursor and bold enhancements are all binary "0" levels, and the output bit of the output shift register is at a binary "0" or a binary "1" level, then normal video will result.

TABLE IV

| INVERSE | CURSOR | BOLD | OSR | V1 | V2 | |
|---|---|---|---|---|---|---|
| 0 | 0 | 0 | 0 | 0 | 0 | Normal Video |
| 0 | 0 | 0 | 1 | 0 | 1 | Normal Video |
| 0 | 0 | 1 | 0 | 0 | 0 | Bold Video |
| 0 | 0 | 1 | 1 | 1 | 1 | Bold Video |
| 0 | 1 | 0 | 0 | 0 | 1 | Cursor Video |
| 0 | 1 | 0 | 1 | 1 | 1 | Cursor Video |
| 0 | 1 | 1 | 0 | 0 | 1 | Bold Cursor |
| 0 | 1 | 1 | 1 | 1 | 1 | Bold Cursor |
| 1 | 0 | 0 | 0 | 1 | 0 | Inverse Normal |
| 1 | 0 | 0 | 1 | 0 | 0 | Inverse Normal |
| 1 | 0 | 1 | 0 | 0 | 1 | Inverse Bold |
| 1 | 0 | 1 | 1 | 0 | 0 | Inverse Bold |
| 1 | 1 | 0 | 0 | 1 | 1 | Inverse Cursor |
| 1 | 1 | 0 | 1 | 0 | 0 | Inverse Cursor |
| 1 | 1 | 1 | 0 | 1 | 1 | Inverse Bold Cursor |
| 1 | 1 | 1 | 1 | 0 | 0 | Inverse Bold Cursor |

Prom Enhancements

The underline, strike-through, cross hatch, italic and dashed underline enhancements are stored in the enhancement matrix PROM 426. These dot patterns are used to overstrike the data character obtained from prom 424 with the selected enhancement. Preferably, a cross hatch enhancement causes a checkerboard of alternate pixels to be produced as a background for the normal (or bold) video. Cross hatch is compatible with all other enhancements.

The strike-through enhancement causes a horizontal line to be produced through the character on the 8th pixel from the top of each line. Underline enhancement is the same as strike-through, except on the 15th pixel from the top. The italic enhancement illustrated herein is preferably a 45° angled slanted strike-through in normal video.

Examples of strike-through and italic enhancements are illustrated in FIGS. 21*a, b, c* and 22*a, b, c*. As shown in FIG. 21*a*, a data character 0 is illustrated as having a dot pattern on a 12×15 pixel matrix. Each "X" is indicative of a dot position and may be stored as a "binary 1" level in the matrix PROM. FIG. 21*b* illustrate a strike-through character which is stored in the enhancement PROM 426. The bit patterns obtained from the PROMS 424 and 426 are OR'ed through OR gate 428 during the loading of the output shift register OSR. If the enhancement character only were displayed on the screen, it would appear as shown in FIG. 21*b*, and similarly, if only the data character 0 is displayed, it would appear as in FIG. 21*a*. However, since the stroke patterns for the two data characters are OR'ed together then once the 12 strokes have been completed, the strike-through character enhancement will be overstruck ontop of the data character 0 so that the result appears as shown in FIG. 21*c*.

Reference is now made to FIGS. 22*a, b, c* which in a manner similar to that of FIGS. 21*a, b, c* illustrates the display of a data character 0 in FIG. 22*a*. The italics enhancement character would appear as shown in FIG. 22*b* if displayed separately on the screen. Consequently, then if the data character 0 is accompanied by an italic enhancement character then when the stroke patterns are OR'ed together, the display will appear essentially as shown in FIG. 22*c*. This represents an italicized character.

In addition to providing enhancement characters, the programmable enhancement PROM 426 may store different fonts of characters which differ from those in the character matrix PROM 424 for purpose of overstriking a data character from PROM 424 with additional visual graphics. An example of this is illustrated in FIGS. 23*a, b, c*. Here again, a data character 0 is obtained from the character matrix PROM 424. Associated with the data character in the data stream is a character modifier (instead of enhancement) which may take the form of a vertical bar as shown in FIG. 23*b*. If the two stroke patterns be OR'ed together, by OR gate 428, then the result will be data character 0 which has been overstruck by a vertical bar so as to obtain a new character as shown in FIG. 23*c*. This then permits generation of for example, a Greek or symbolic alphabet. Various combinations of graphics may be stored in matrix PROM 426 for use in overstriking selected characters obtained from PROM 424.

Returning now to the description of operation of the circuitry of FIG. 15, it is recalled that a data character pattern and its enhancement are obtained from accessing buffer A twice. For this first data character, in a vertical column of 27 data characters, a stroke pattern is placed in the output shift register OSR for the 15 pixels associated with the first vertical stroke through the character. As the beam traverses vertically through the first stroke it is blanked and unblanked in accordance with the stroke pattern outputted from the output shift register OSR. Enhancements to the character in accordance with those stored in the enhancement register 430 are controlled by varying the V1 and V2 signal levels. While the first stroke of the first character is being generated on a display screen, the read counter 408 is incremented so as to address the next data character in buffer A. This took place during pixel counts PXCT18, 19. The next character is then loaded into the character data register 422 to address the character matrix PROM 424. Since the stroke count is the same, only the first stroke pattern of the next character is obtained from PROM 424. Buffer A is read a second time at pixel counts PXCT9, 10 to obtain the enhancement character. Enhancement characters are used to address the enhancement PROM 426 as well as to store the enhancement bit pattern for blank, inverse and bold in register 430.

The enhancement from PROM 426 is OR'ed with the stroke pattern from PROM 424 by OR gate 428 and loaded into the parallel input-serial output shift register OSR at pixel counts PXCT18 and 19. Thereafter, the output shift register OSR shifts a serial bit stream out as it is clocked by the phase A clock and this presents the bit data for the first stroke of the second character in the vertical column of characters together with the PROM enhancements. Each bit of this bit pattern is then further modified by the video mixer intensity control 434 in accordance with the blank inverse or bold enhancements (or the cursor enhancement) so as to thereby vary the video V1 and V2 levels for that pixel. Video is unblanked by the video mixer intensity control 434 only when the phase B clock is at a high level so that a substantially round spot is produced on the screen of the CRT. As is noted from the waveforms of FIG. 16, one stroke through a character column includes 32 line counts, as counted by line counter 302. During counts 28, 29, 30, 31 and 32, time is provided for vertical retrace of the CRT beam. Also, the stroke counter 305 increments the character column counter 308 for commencement of a second stroke through the first character column. The read count 408 is reset by the character buffer control 404 when it detects that the line counter has attained a count of 32.This then has indexed the address counter to again address the first character in the column of characters being displayed. The operation will continue as discussed with respect to the first stroke through this column of characters except that the stroke count obtained from stroke counter 306 has been incremented by one so that the addressing of PROMs 424 and 426 provides the stroke pattern for the second stroke through the data character. This is repeated 12 times for the 12 strokes for a character field. Once 12 strokes have been completed, the video generator will operate to display the second vertical character data column. The read buffer A signal RDBUFA will now change state and the contents stored in buffer B 402 will be read. During this period, data will be written into buffer A in the main memory M in the manner as discussed previously. This operation will alternate between buffer A and buffer B for 72 character columns (in the case of single column mode) or for 35 character columns, two blank character columns and then continue for character columns 38 through 72 (in the dual screen or dual column mode).

DIRECT MEMORY ACCESS CIRCUIT

Figure 24:
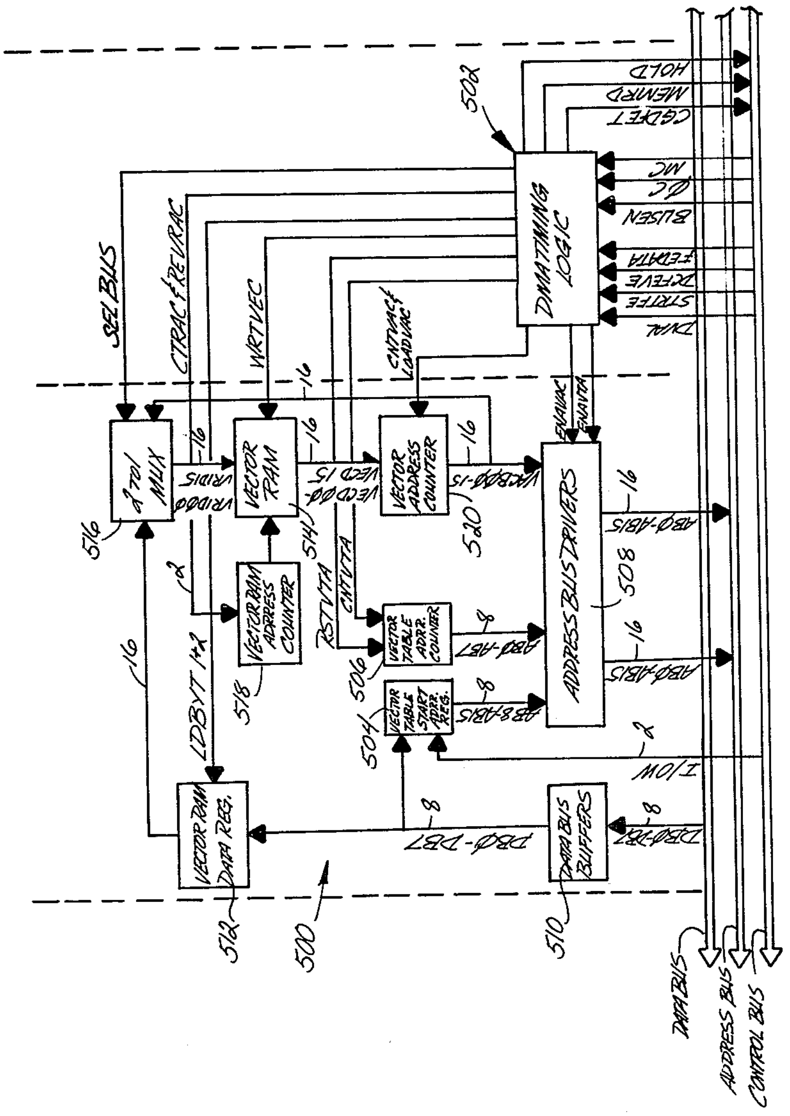
FIG. 24 is a schematic-block diagram illustration of the direct memory access circuitry.

The direct memory address circuit DMA of FIG. 2 is shown in greater detail in FIG. 24. The DMA logic circuitry performs the following system functions:

1. Fetches Display Line Vectors From Main RAM Memory M On Command From The Character Generator CG.
2. Stores, Controls and Updates These Vectors As Required To Present Them As Addresses To Main RAM Memory M For Character Generator Data Fetches.
3. Fetches Display Character Data For The Character Generator On Command From The Character Generator.

The DMA circuit includes an addressing circuit 500 and DMA timing logic circuitry 502. The DMA addressing circuit performs a repetitious sequence of addressing functions required by the system under control of the DMA timing logic. The address circuitry performs the following functions:

(1) Generates the vector table addresses which are used to access the main RAM memory M during the vector fetch mode to obtain starting addresses of the character data for each line of display.

(2) Stores and updates the display line vectors and presents these vectors as addresses to main RAM memory M during character generator data fetches. The data obtained from these fetches is character codes and enhancement data to be stored in the buffer RAM's (A buffer 400 and B buffer 402 in FIG. 15) for use by the video generator.

Vector Table Addressing

The DMA addressing circuit 500 includes a vector table start address register 504. Upon intialization of the terminal, the IO write line I/OW is raised as to load 8 MSB bits from the data bus into the address register 504. These 8 bits together with another 8 bits obtained from a vector table address counter 506 provide a 16 bit address for addressing the main RAM memory during the vector fetch mode to obtain a starting address of the character data for each line of display. As will be noted, the vector table address counter 506 provides the 8 LSB bits for this 16 bit address and the counter is reset by the DMA timing logic circuit 502 when it raises its reset vector table address signal RSTVTA. This occurs at the beginning of each frame and is incremented after each access by the CNTVTA signal. The 8 MSB bits from register 504 together with the 8 LSB bits from counter 506 are supplied through a suitable address bus driver circuit 508 and supplied to the address bus for addressing the main RAM M.

The data obtained from the main memory M is supplied over the data bus as two 8 bit data bytes which are loaded through a data bus driver 510 to a vector RAM data register 512 when the load byte 1 and load byte 2 signals LDBYT 1 and LDBYT 2 are raised. This then presents a 16 bit vector which is loaded into a vector RAM 514 through a multiplexer 516 which is switched to this path during vector fetch mode by the SELBUS signal from the timing logic 502. The 16 bit vector is loaded into the vector RAM at an address determined by a vector RAM address counter 518 and at a point in time when the vector RAM is in its load mode, as determined by the raising of a write vector signal WRTVEC from the timing logic 502. The vector RAM address counter 518 is reset before each vector fetch and before each column data fetch by a reset vector RAM address counter signal RSVRAS. The address counter is incremented by one count after each write operation by a count signal CTVRAC whether or not the operation is a vector fetch or a data fetch. The vector address counter 520 is used only for data fetches and serves to receive the 16 bit vectors from the vector RAM 514. This counter will be loaded before each access for a data byte, is incremented to obtain the address of the enhancement byte associated with the data byte, then is counted again to get the address of the data byte for the next character on that line and this is written back into the vector RAM through the multiplexer 516.

The DMA addressing circuit 500 will be described in greater detail hereinafter with respect to the waveforms of FIGS. 25 and 26.

DMA Timing Circuit

The DMA timing logic circuit 502 controls the sequence of events within a vector fetch and a data fetch operation. A vector fetch operation is initiated by either a start fetch (STRTFE) or a dual column fetch vector (DCFEVE) signal. The start fetch signal STRTFE and the start frame signal STRTFR occur concurrently. The STRTFE signal occurs at the beginning of each frame and a DCFEVE occurs at column count 35 of each frame if the character generator is in the dual column mode. Only the STRTFE signal serves to clear or reset the vector table address counter 506. The other mode of operation involves data fetching. This is initiated by the fetch data (FEDATA) signal. These signals are supplied by the DMA control logic circuit 312 and the display control logic circuit 310 (see FIG. 14). When one of these signals is received, the DMA timing logic circuit 502 raises its HOLD signal to the control bus. HOLD is acknowledged by the CPU as soon as it finishes its current bus activity by raising its bus enable signal BUSEN which is supplied back to the DMA timing logic circuit 502. At that time, the DMA circuit issues a memory read MEMRD signal for each of the two memory accesses.

Vector Data Fetch Operation

Figure 25:
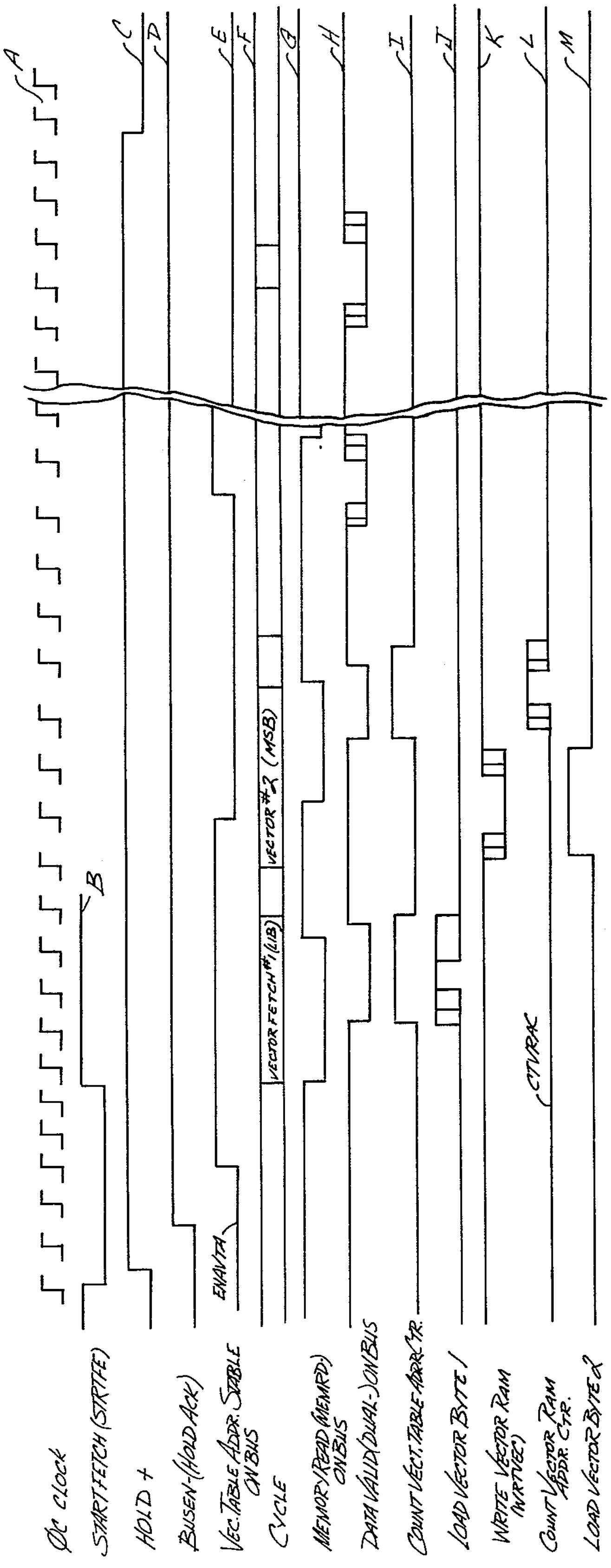
FIGS. 25*a* through 25*m* are waveforms useful in describing the circuitry of FIG. 24; and, FIGS. 26*a* through 26*p* are waveforms useful in describing the circuitry of FIG. 24.

To facilitate an understanding of the vector fetch operation, reference should be made to both FIG. 24 as well as to the waveforms of FIG. 25. At the start of each frame (or column in dual screen or dual column mode), the DMA fetches line vectors from the line vector table in the main RAM memory M using the vector table address counter 506 to furnish the LSB 8 bits together with the MSB 8 bits which were initialized into the vector table start address register 504. Start frame (and column 36 in dual screen or dual column only) are the timing signals which initiate the vector fetch operation.

Data returning from each vector fetch is assembled into a 16 bit address in register 512 and is then written into sequential locations in the vector RAM 514. When the vector fetch is completed, the vector RAM contains the addresses, in order, of the data for character column 1 (or 38 in dual column or dual screen mode).

The start fetch signal STRTFE (or dual column fetch vector signal DCFEVE in dual screen or dual column mode) are supplied to the DMA timing logic circuit 502 from the timing generator TG (FIG. 14). The DMA logic circuit 502 responds to the start fetch signal STRTFE to produce a reset signal RSTVTA for resetting the vector table address counter 506. Additionally, the DMA timing logic 504 produces another reset signal REVRAC which is used to reset the vector RAM address counter 518. The dual column fetch vector signal DCFEVE has the same results as the start vector signal STRTFE except that the vector table address counter 506 is not reset. Additionally, the SELBUS signal is supplied to the multiplexer 516 so as to permit data from the vector RAM data register to be supplied through the multiplexer to the vector RAM 514. The DMA timing logic circuit 502 also raises its hold signal HOLD which is supplied by the control bus to the CPU. As soon as the CPU finishes its current bus activity, it acknowledges this signal by raising its bus enable signal BUSEN (HOLDACK). This permits the vector table address to be gated onto the bus when the DMA timing logic 502 raises its ENAVTA signal to the address bus drivers 508. This is followed by a memory read MEMRD signal supplied by the DMA timing logic 502 to the control bus CB. This sets up a reading of the main memory at the address obtained from register 504 and counter 506. When the memory is accessed and the data is valid, it provides a data valid signal DVAL and when this occurs the vector table address is counted. At this time, the DMA timing logic circuit 502 also provides a load vector byte 1 signal which loads the LSB 8 bit byte into the vector RAM data register 512. The memory read MEMRD signal is then negated (see FIG. 25*g*). The data valid signal DVAL is negated (see FIG. 25*h*) in response to the negation of the MEMRD signal. This sets up the production of a memory read signal MEMRD on the next clock cycle.

On the next occurence of the data valid signal DVAL there will result a load vector byte 2 signal (see FIG. 25*m*) which is used to load the MSB 8 bit byte into the vector RAM data register 512. Additionally, at this time, the vector table address counter 506 is incremented by the production of a count vector table address signal CNTVTA (see FIG. 25*i*). The memory read signal MEMRD is terminated and the vector table is removed from the bus. The 16 bits in the vector RAM data register are then loaded into the vector RAM 514 when the write vector RAM signal WRTVEC is produced (see FIG. 25*k*). Thereafter, the vector RAM address counter is incremented by a count vector RAM address count signal CTVRAC (see FIG. 251). The foregoing is repeated sequentially so that the vector RAM after the completed cycle contains 54 vector fetch memory cycles arranged as 7, 16 bit addresses representing the data bytes for the first character in each display line.

Character Data Fetch Operation

Figure 26:
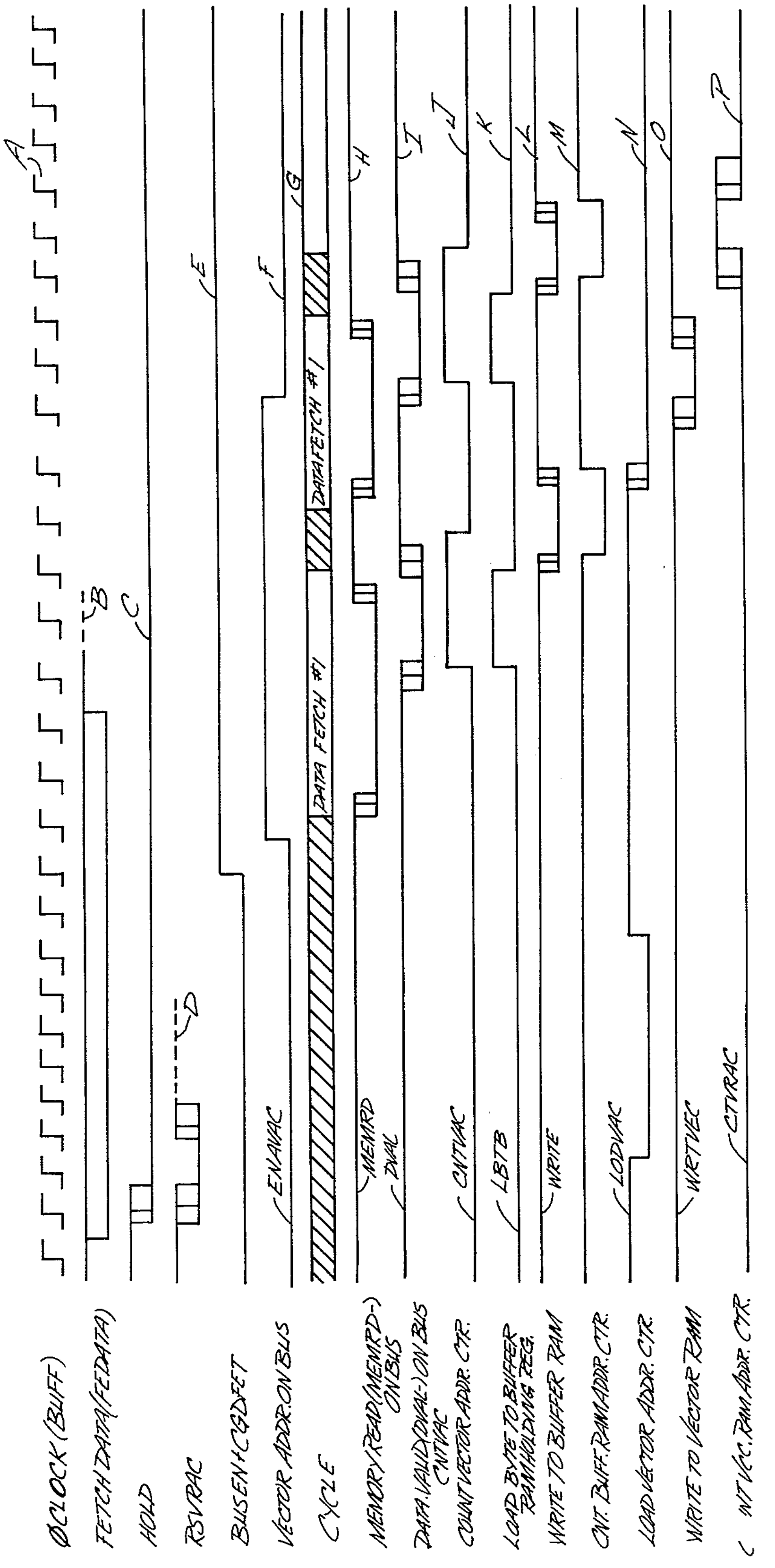

The character data fetch operation may be best understood with reference to both the DMA circuitry shown in FIG. 24 along with the waveforms illustrated in FIG. 26. The next stroke 1 following the vector fetch operation initiate fetching of character data from the main RAM by using addresses stored in the vector RAM 514. The first address is read from the vector RAM 514 and is stored in the vector address counter 520. The contents of the counter 520 are used for one memory access (data) and is incremented by one count which is used for a second access (enhancement). The counter is then incremented again and the contents of the counter is rewritten into the vector RAM 514. The vector RAM address counter 518 is then incremented by one count and the process is repeated. This continues until all 27 characters of the first column have been read. The vector RAM 514 then contains the addresses of the second column of characters. The process continues until the entire screen (or half screen in the dual column or dual screen mode) has been read and the vectors are re-initialized.

The data fetch mode commences with a fetch data signal FEDATA (see FIG. 26*b*). This causes a reset vector RAM address counter signal RSVRAC (see FIG. 26*d*) which is used to reset the vector RAM address counter 518. The HOLD signal (FIG. 26*c*) is also placed on the control bus CB. Thus, the vector address counter 520 is set to load from address zero of the vector RAM 514. After a suitable time delay, a loading operation commences on the development of a count vector address counter signal CNTVAC and load vector address counter signal LODVAC. This is applied as a load signal to the vector address counter 520 so that the vector RAM address zero is loaded into the vector address counter. When the CPU responds, with a bus enable signal BUSEN, the timing logic 502 enables the address contained in the vector address counter 520 onto the address bus AB. After a suitable time delay, the MEMRD signal (FIG. 26*i*) is asserted on the control bus CB. The BUSEN signal is also used to generate the character generator data fetch signal CGDFET (see FIG. 26*e*) to the character buffer control logic 404 (see FIG. 15) to signal that this is data to be loaded into the buffer A or buffer B RAM's 400 or 402 when data valid DVAL signal occurs. The signal load byte to buffer LVTB (FIG. 15 and FIG. 26*m*) serve this function. On the leading edge of the data valid signal DVAL, the vector address counter 520 is incremented by a count vector address counter signal CNTVAC (see FIG. 26*l*) to fetch the enhancement byte on the next memory cycle.

The same sequence occurs during the second data fetch memory cycle. Thus, at the data valid signal DVAL during the second cycle, the vector address counter is again counted so that its contents now point to the next character data word to be fetched. A wire vector RAM pulse WRTVEC is supplied to the vector RAM to load the updated vector back into the RAM 514 for use in fetching data for the next character column. Two clock pulses later the count vector RAM address counter is incremented by a count signal CTVRAC (see FIG. 26*r*). Thus, the vector RAM address counter is positioned to read the next vector which is loaded into the vector address counter 520 after an appropriate time delay. This cycle then repeats until the 27 data and enhancement characters have been read.

Whereas the invention has been described with respect to a preferred embodiment it is to be appreciated that it is not limited to the same as various modifications and arrangements may be made without departing from the scope and spirit of the appended claims.

What is claimed is:

1. A video display system for displaying dot pattern images of data characters on a display screen with dot pattern modifications to the video characteristics thereof and comprising:

means for providing a plurality of coded data characters each representing a dot pattern image to be displayed and a like plurality of coded enhancement characters each representing one or more of a plurality of video dot pattern modification enhancements with each said enhancement character being associated with only one of said data characters, means responsive to each said coded data character for providing dot pattern video signals for forming the dot pattern image represented thereby, means responsive to each said coded enhancement character for modifying the dot pattern video signals for the associated data character in accordance with the video dot pattern enhancement therefor as represented by said coded enhancement character, and means responsive to said modified video signals for forming a video image with said video dot pattern enhancement.

2. A system as set forth in claim 1, said video image forming means includes vertical raster scanning means for forming lines of text of images of data characters by sequentially forming vertical columns of images of said data characters with each data image in a column forming one of the data character images of a said line.

3. A system as set forth in claim 2, wherein each said data character image is formed from a dot matrix comprising a plurality of columns and rows of dot positions.

4. A system as set forth in claim 3, wherein said video signals for forming a data character image includes a plurality of instruction sequences for displaying dots at said dot positions.

5. A system as set forth in claim 4, wherein said modifying means includes means for changing said instruction sequences in dependence upon the enhancement represented by said enhancement character.

6. A system as set forth in claim 1, wherein said video signal providing means includes a read only memory for providing instruction sequences for forming the images of a data character as a plurality of dot slices.

7. A system as set forth in claim 6, wherein each dot slice comprises vertical column of dot positions and an instruction sequence commands display of dots at selected ones of said dot positions.

8. A system as set forth in claim 7, wherein said modifying means includes means for modifying said instruction sequence commands in dependence upon the enhancement represented by said enhancement character.

* * * * *